(12) United States Patent
Mishra et al.

(10) Patent No.: US 11,886,366 B2
(45) Date of Patent: Jan. 30, 2024

(54) ONE-WIRE BIDIRECTIONAL BUS SIGNALING WITH MANCHESTER ENCODING

(71) Applicant: QUALCOMM Incorporated, San Diego, CA (US)

(72) Inventors: Lalan Jee Mishra, San Diego, CA (US); Umesh Srikantiah, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/677,731

(22) Filed: Feb. 22, 2022

(65) Prior Publication Data
US 2023/0267085 A1    Aug. 24, 2023

(51) Int. Cl.
| | |
|---|---|
| G06F 13/362 | (2006.01) |
| G06F 1/12 | (2006.01) |
| G06F 13/42 | (2006.01) |
| H04L 12/40 | (2006.01) |

(52) U.S. Cl.
CPC ............. *G06F 13/362* (2013.01); *G06F 1/12* (2013.01); *G06F 13/4282* (2013.01); *H04L 12/40* (2013.01)

(58) Field of Classification Search
CPC ...... G06F 13/362; G06F 1/12; G06F 13/4282; H04L 12/40
USPC .......................... 710/6, 20, 33, 105, 107, 110
See application file for complete search history.

(56) References Cited

U.S. PATENT DOCUMENTS

| | | | | |
|---|---|---|---|---|
| 5,559,502 | A * | 9/1996 | Schutte | H04L 12/4035 370/476 |
| 6,064,705 | A * | 5/2000 | Zalud | G08G 1/017 375/361 |
| 7,089,338 | B1 * | 8/2006 | Wooten | G06F 13/4291 710/48 |
| 7,752,365 | B2 * | 7/2010 | Taylor | G06F 13/4286 710/110 |

(Continued)

OTHER PUBLICATIONS

International Search Report and Written Opinion—PCT/US2023/010409—ISA/EPO—dated Apr. 28, 2023.

(Continued)

*Primary Examiner* — Idriss N Alrobaye
*Assistant Examiner* — Henry W Yu
(74) *Attorney, Agent, or Firm* — Loza & Loza, LLP/Qualcomm

(57) ABSTRACT

An apparatus coupled to a single-wire serial bus through a line driver is configured to determine that a first sequence start condition (SSC) has been initiated when the single-wire serial bus transitions from first to second signaling states. The line driver drives the single-wire serial bus to the first signaling state after a first duration to complete the first SSC, and an arbitration window with plural timeslots is provided when the line driver presents a high impedance to the single-wire serial bus after the first SSC. The line driver drives the single-wire serial bus to the first signaling state in each timeslot of the plural timeslots in which the single-wire serial bus is driven to the second signaling state. After the arbitration window has expired, the apparatus transmits a second SSC and a Manchester encoded command addressed to at least one slave device.

27 Claims, 15 Drawing Sheets

(56) References Cited

U.S. PATENT DOCUMENTS

| | | |
|---|---|---|
| 7,788,430 B2 | 8/2010 | Parris et al. |
| 2015/0199295 A1* | 7/2015 | Sengoku .................. G06F 1/12 710/110 |
| 2016/0179746 A1* | 6/2016 | Hein .................. G06F 13/4291 710/105 |
| 2017/0024354 A1 | 1/2017 | Zhang et al. |
| 2019/0227968 A1* | 7/2019 | Chun ........................ G06F 1/28 |
| 2020/0083875 A1 | 3/2020 | Mishra et al. |
| 2020/0201804 A1 | 6/2020 | Graif et al. |
| 2020/0344094 A1 | 10/2020 | Mishra et al. |
| 2022/0004513 A1 | 1/2022 | Prasad et al. |

OTHER PUBLICATIONS

MIPI: "MIPI Alliance Specification for RF Front-End Control Interface", MIPI Alliance Specification for RFFE , Jul. 26, 2011, XP055437406, 90 Pages.

* cited by examiner

ONE-WIRE BIDIRECTIONAL BUS SIGNALING WITH MANCHESTER ENCODING

TECHNICAL FIELD

The present disclosure relates generally to serial communication and, more particularly, to providing timing of read operations involving devices configured for one-wire communication through a Radio Frequency Front-End interface.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus is operated in accordance with an Inter-Integrated Circuit (I2C bus or I2C) protocol. The I2C bus was developed to connect low-speed peripherals to a processor, where the I2C bus is configured as a multi-drop bus. A two-wire I2C bus includes a Serial Data Line (SDA) that carries a data signal, and a Serial Clock Line (SCL) that carries a clock signal. In another example, the Improved Inter-Integrated Circuit (I3C) protocols defined by the Mobile Industry Processor Interface (MIPI) Alliance derive certain implementation aspects from the I2C protocol including separate clock and data lines.

In another example, the Radio Frequency Front-End (RFFE) interface defined by the MIPI Alliance provides a communication interface for controlling various radio frequency (RF) front-end devices, including power amplifiers (PAs), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links.

In another example, the system power management interface (SPMI) defined by the MIPI Alliance provides a hardware interface that may be implemented between baseband or application processors and peripheral components. In some implementations, the SPMI is deployed to support power management operations within a device.

The use of MIPI-defined serial buses in place of parallel buses can reduce the number of physical general-purpose input/output (GPIO) pins required to support communication between multiple devices. As device complexity increases, demand for GPIO pins also increases and there is continual demand for simplified bus architectures.

SUMMARY

Certain aspects of the disclosure relate to systems, apparatus, methods and techniques that can support communication with device interfaces that use a single-wire link. In some implementations, a combination of control signaling and Manchester encoding can be used to maintain synchronization between clock signals in transmitting and receiving devices. The single-wire link may format datagrams in accordance with RFFE, SPMI or another standards-defined protocol.

In various aspects of the disclosure, a method of data communication performed at a bus master device, comprising: determining that a first sequence start condition (SSC) has been initiated when a single-wire serial bus has transitioned from a first signaling state to a second signaling state; causing a line driver to drive the single-wire serial bus from the second signaling state to the first signaling state after a first duration, thereby completing the first SSC; providing an arbitration window that comprises a plurality of timeslots by causing the line driver to present a high impedance to the single-wire serial bus after the first SSC is completed; causing the line driver to drive the single-wire serial bus to the first signaling state in each timeslot in the plurality of timeslots in which the single-wire serial bus is driven to the second signaling state; transmitting a second SSC after the arbitration window is expired; and transmitting a command addressed to at least one slave device after transmitting the second SSC, the command being encoded using Manchester encoding.

In various aspects of the disclosure, a data communication apparatus, comprising: a line driver configured to couple the data communication apparatus to a single-wire serial bus; and a protocol controller configured to: determine that a first SSC has been initiated when the single-wire serial bus has transitioned from a first signaling state to a second signaling state; cause the line driver to drive the single-wire serial bus from the second signaling state to the first signaling state after a first duration, thereby completing the first SSC; provide an arbitration window that comprises a plurality of timeslots by causing the line driver to present a high impedance to the single-wire serial bus after the first SSC is completed; cause the line driver to drive the single-wire serial bus to the first signaling state in each timeslot in the plurality of timeslots in which the single-wire serial bus is driven to the second signaling state; transmit a second SSC after the arbitration window is expired; and transmit a command addressed to at least one slave device after transmitting the second SSC, the command being encoded using Manchester encoding.

In various aspects of the disclosure, a method of data communication performed at a slave device, comprising: determining a duration of a pulse on a single-wire serial bus; driving the single-wire serial bus from a first signaling state to a second signaling state during a timeslot associated with the slave device in an arbitration window that follows the pulse on the single-wire serial bus when the pulse has a first duration that corresponds to a first type of SSC; receiving a Manchester encoded command from a bus master device over the single-wire serial bus when the pulse has a second duration that corresponds to a second type of SSC; and responding to the command when the command is addressed to the slave device.

In various aspects of the disclosure, a data communication apparatus, comprising: a line driver configured to couple the data communication apparatus to a single-wire serial bus; and a protocol controller configured to: determine a duration of a pulse on the single-wire serial bus; drive the single-wire serial bus from a first signaling state to a second signaling state during a timeslot associated with the data communication apparatus in an arbitration window that follows the pulse on the single-wire serial bus when the pulse has a first duration that corresponds to a first type of SSC; receive a Manchester encoded command from a bus master device over the single-wire serial bus when the pulse has a second duration that corresponds to a second type of SSC; and respond to the command when the command is addressed to the data communication apparatus.

DETAILED DESCRIPTION

Figure 1:
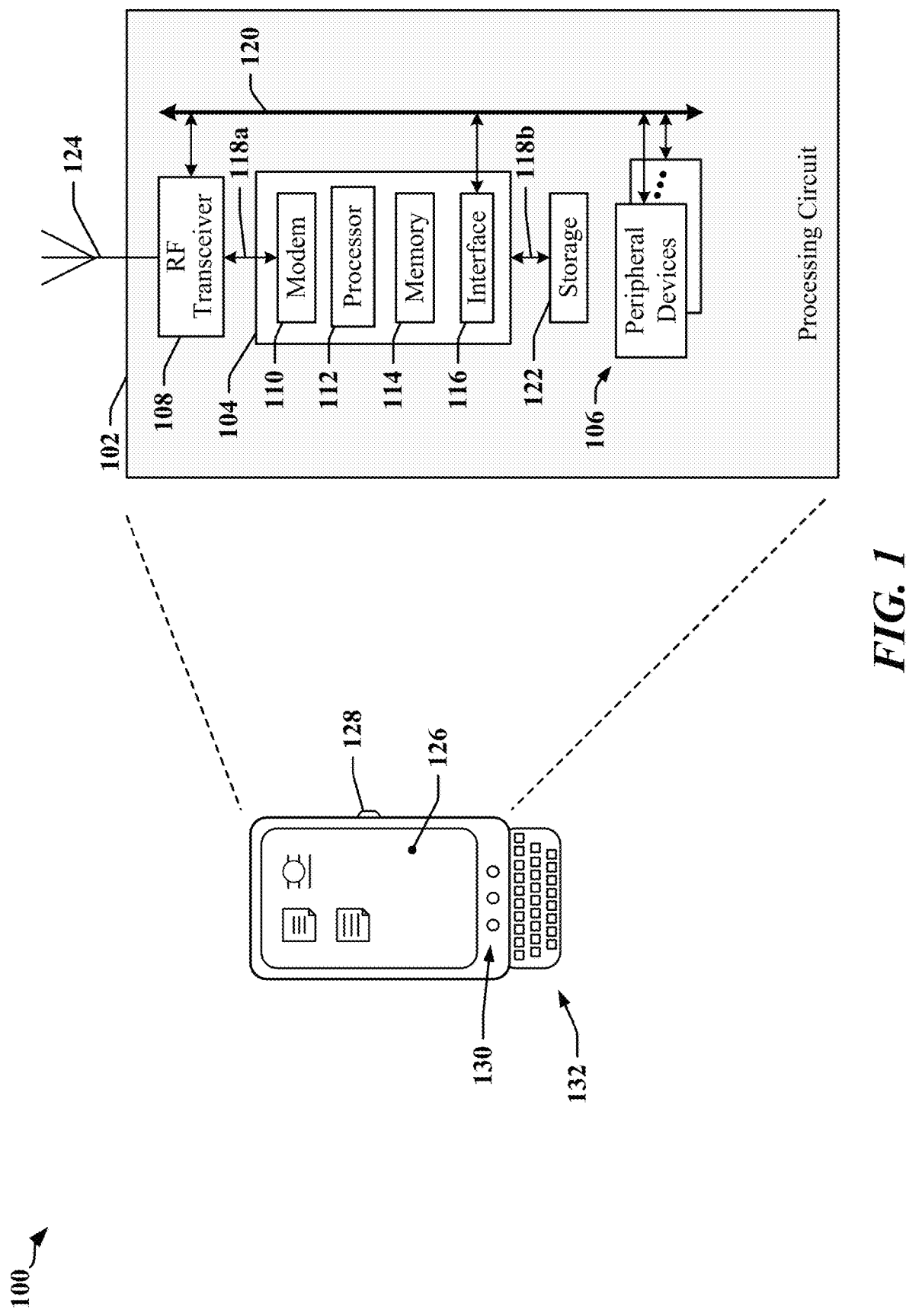
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Certain aspects of the disclosure relate to serial bus configurations in which multiple devices can communicate at various times. The described serial buses are typically operated in a hierarchical manner, in that one device controls communication during a transaction. The controlling device may be referred to as a host device, a bus master device, a managing device or another term favored by standards defining the protocols implemented by the controlling device. In some serial bus configurations, a single controlling device manages or controls communication during all transactions conducted over the serial bus. In other serial bus configurations, multiple devices can operate as the controlling device and one device serves as the controlling device for each transaction conducted over the serial bus. The controlling device may provide a common clock signal that is transmitted over a conventional two-wire serial bus. The controlling device may provide control signaling that identifies a type of transaction to be conducted over a conventional two-wire serial bus. During certain transactions, a controlling device may transmit commands directed to one or more receiving devices using address information provided in or with the commands. The receiving devices may be referred to as a client device, a slave device, a peripheral device or another term favored by standards defining the protocols implemented by the controlling device. For the purposes of this disclosure, a controlling device will be referred to as a bus master device and associated receiving devices will be referred to as slave devices.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the imposition of more stringent timing constraints in support of applications, peripherals and sensors can result in greater demand on GPIO pins and communication link throughput.

Certain aspects of the disclosure relate to techniques for communication over a single wire bus, using Manchester encoding and synchronization signaling that can be distinguished by devices coupled to the single wire bus. The synchronization signaling may be configured to enable receiving devices to synchronize clock signals generated in a device that is currently transmitting over the single wire bus. In one aspect, a bus master device may be adapted to format datagrams in accordance with RFFE or SPMI protocols. A protocol controller may signal a type of transaction to be conducted using a modified sequence start condition (SSC). Various aspects of the of the modified SSC may comply or be compatible with specifications for SSCs defined by RFFE protocols.

Certain aspects of the disclosure relate to a data communication apparatus that has a protocol controller that is configured to control duration of SSCs transmitted over a single-wire serial bus. Different SSCs may indicate that a datagram follows, that an arbitration window follows or that an arbitration procedure is abandoned. Each slave device is assigned a timeslot in the arbitration window and a slave device participates in arbitration by driving the single wire during its assigned timeslot to indicate a request for service. The bus master device may transmit commands and exchange data encoded using Manchester encoding.

Certain aspects disclosed herein provide protocols that may replace or supplement a serial bus protocol, such as an I2C, I3C, SPMI, and/or RFFE protocol. Certain aspects are applicable to a serial bus operated in half-duplex mode or full-duplex mode. Certain aspects are applicable to point-to-point Universal Asynchronous Receiver/Transmitter (UART) interfaces, Line-Multiplexed UART (LM-UART) interfaces, or another type of point-to-point interface. In some implementations, certain aspects disclosed herein may be deployed to support exchange of virtual GPIO (VGI) messages, which can be used to communicate the state or change in state of physical GPIO pins without physical connections between devices. Certain aspects are applicable to multipoint interfaces, point-to-point interfaces, or interfaces switchable between point-to-point and multipoint modes.

Examples Of Apparatus That Employ Serial Data Links

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
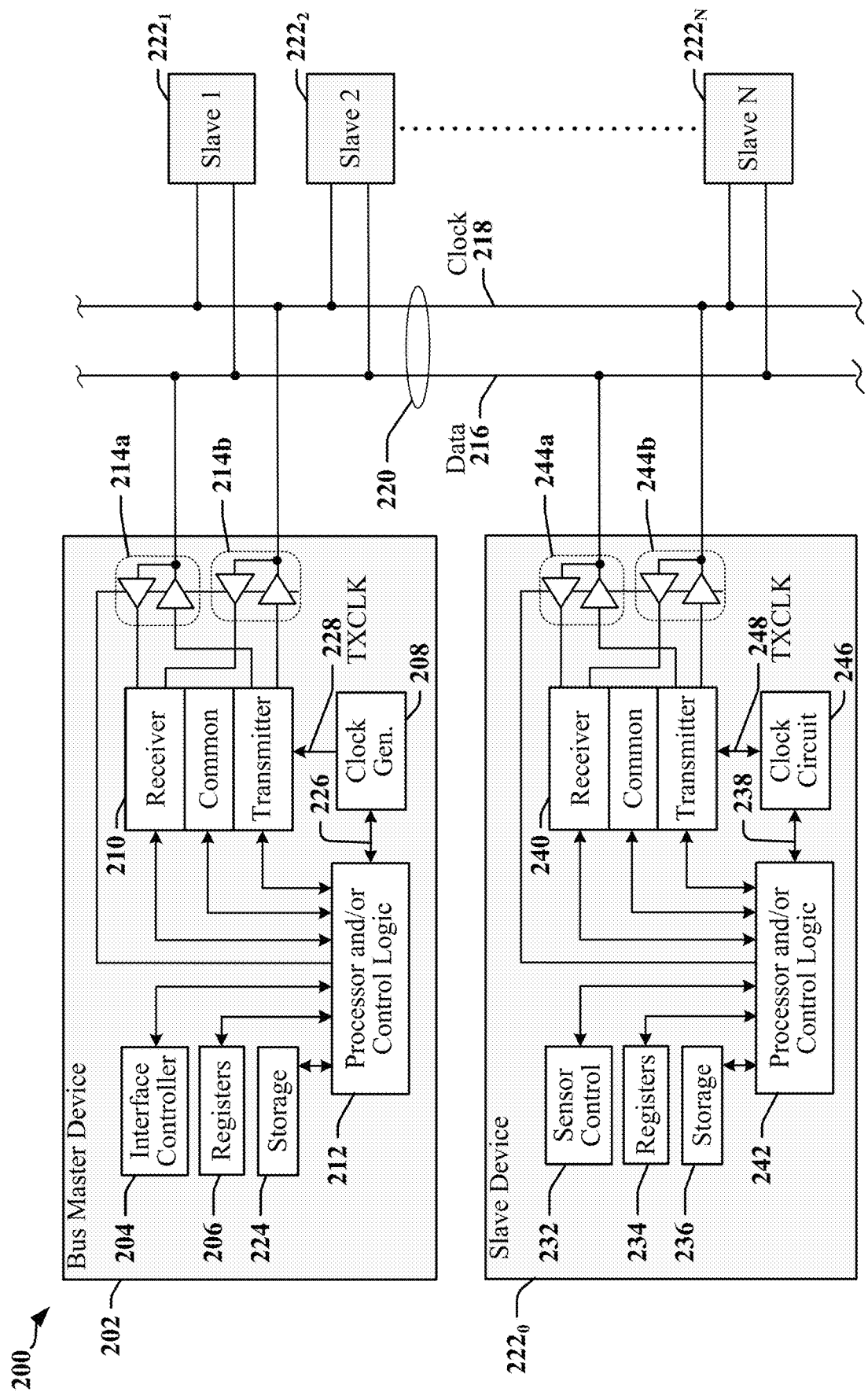
FIG. 2 illustrates a first example of an apparatus employing a data link that may be used to communicatively couple two or more devices.

FIG. 2 illustrates a first example of an apparatus 200 employing a data link that may be used to communicatively couple two or more devices. Here, the apparatus 200 includes multiple devices 202, and $222_0$-$222_N$ coupled to a two-wire serial bus 220. The devices 202 and $222_0$-$222_N$ may be implemented in one or more semiconductor IC devices, such as an application processor, SoC or ASIC. In various implementations certain of the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more devices $222_0$-$222_N$ may be used to control, manage or monitor a sensor device. Communication between devices 202 and $222_0$-$222_N$ over the serial bus 220 is controlled by a bus master device 202. Certain types of bus can support multiple bus masters 202.

In one example, a bus master device 202 may include an interface controller 204 that may manage access to the serial bus, configure dynamic addresses for slave devices and/or generate a clock signal 228 to be transmitted on a clock line 218 of the serial bus 220. The bus master device 202 may include configuration registers 206 or other storage 224, and other control logic 212 configured to handle protocols and/or higher-level functions. The control logic 212 may include a processing circuit such as a state machine, sequencer, signal processor or general-purpose processor. The bus master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

One or more devices $222_0$-$222_N$ may be configured to operate as a slave device. In some examples, a slave device may include circuits and modules that support a display, an image sensor, and/or circuits and modules that control and communicate with one or more sensors that measure environmental conditions. In one example, a device $222_0$ configured to operate as a slave device may provide a control function, module or circuit 232 that includes circuits and modules to support a display, an image sensor, and/or circuits and modules that control and communicate with one or more sensors that measure environmental conditions. In this example, the device $222_0$ can include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. In some instances, the clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one of the devices 202 and $222_0$-$222_N$ may be configured to operate as a bus master device and a slave device on the serial bus 220. Two or more of the devices 202 and $222_0$-$222_N$ may be configured to operate as a bus master device on the serial bus 220. The protocol selected to control operation of the serial bus 220 may define direct current (DC) characteristics affecting certain signal levels associated with the serial bus 220, and/or alternating current (AC) characteristics affecting certain timing aspects of signals transmitted on the serial bus 220. In various examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
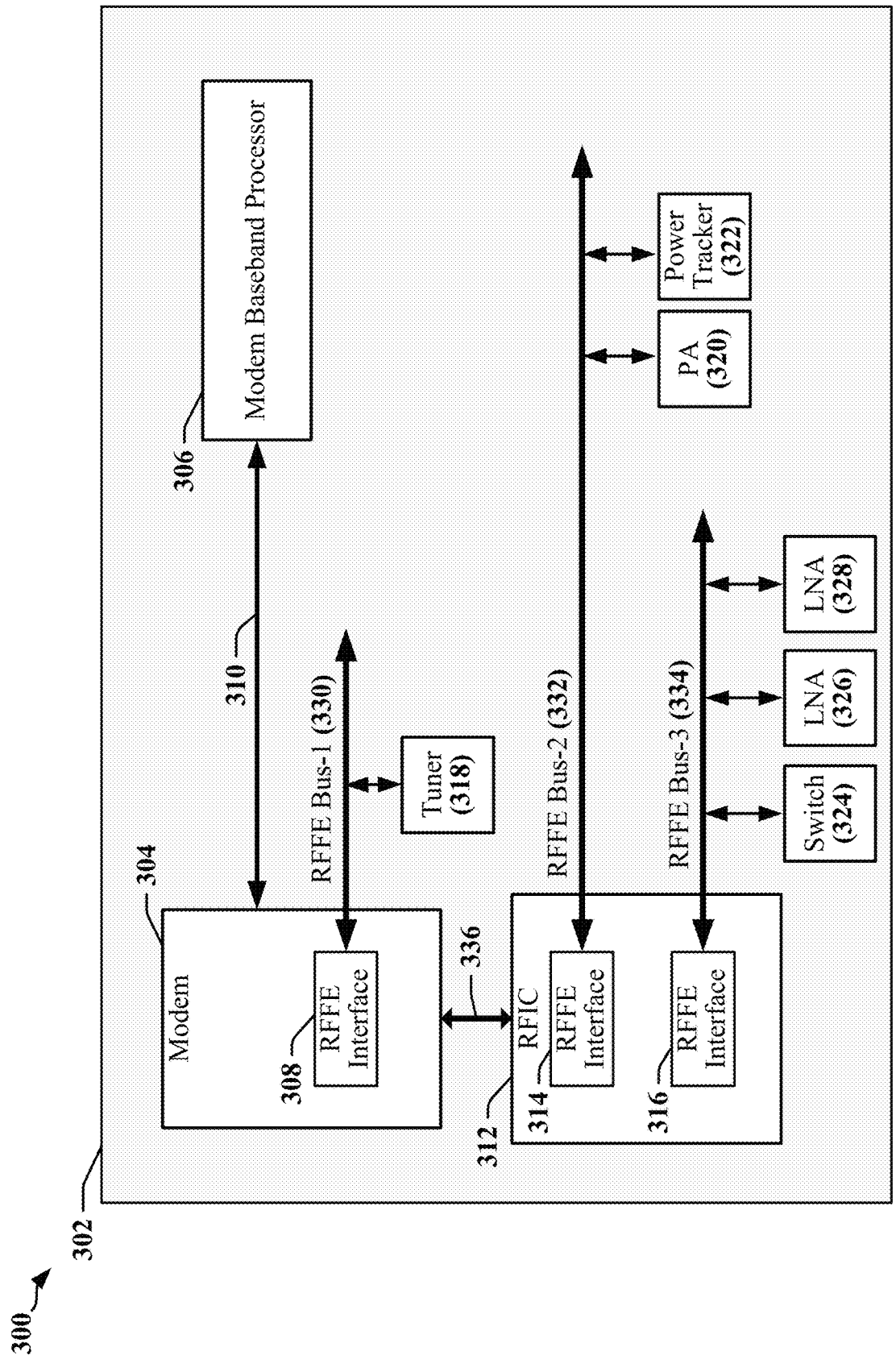
FIG. 3 illustrates a second example of an apparatus employing data links that may be used to communicatively couple two or more devices, including various radio frequency front-end devices.

FIG. 3 illustrates a second example of an apparatus 300 employing data links that may be used to communicatively couple two or more devices. In this example, a chipset or device 302 employs multiple RFFE buses 330, 332, 334 to couple various RF front-end devices 318, 320, 322, 324, 326, 328. A modem 304 includes an RFFE interface 308 that couples the modem 304 to a first RFFE bus 330. The modem 304 may communicate with a baseband processor 306 and a Radio-Frequency IC (RFIC 312) through one or more communication links 310, 336. The illustrated device 302 may be embodied in one or more of a mobile communication device, a mobile telephone, a mobile computing system, a notebook computer, a tablet computing device, a media player, a gaming device, a wearable computing and/or communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the Modem is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and a second RFFE bus 332. The RFIC 312 may communicate with a switch 324 and one or more LNAs 326, 328 through a second of its RFFE interfaces 316 and a third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized GPIO state. In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 324, LNAs 326, 328, PAs 320 and other types of device that operate concurrently in a manner that can generate inter-device interference, or that could potentially cause damage to one or more devices. Devices that may interfere with one another may exchange coexistence management (CxM) messages to permit each device to signal imminent actions that may result in interference or conflict. CxM messages may be used to manage operation of shared components including a switch 324, LNA 326, 328, PA 320 and/or an antenna.

Multi-drop interfaces such as RFFE, SPMI, I3C, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols may be employed to illustrate certain aspects disclosed herein. However, the concepts disclosed herein are applicable to other serial bus protocols and standards.

Figure 4:
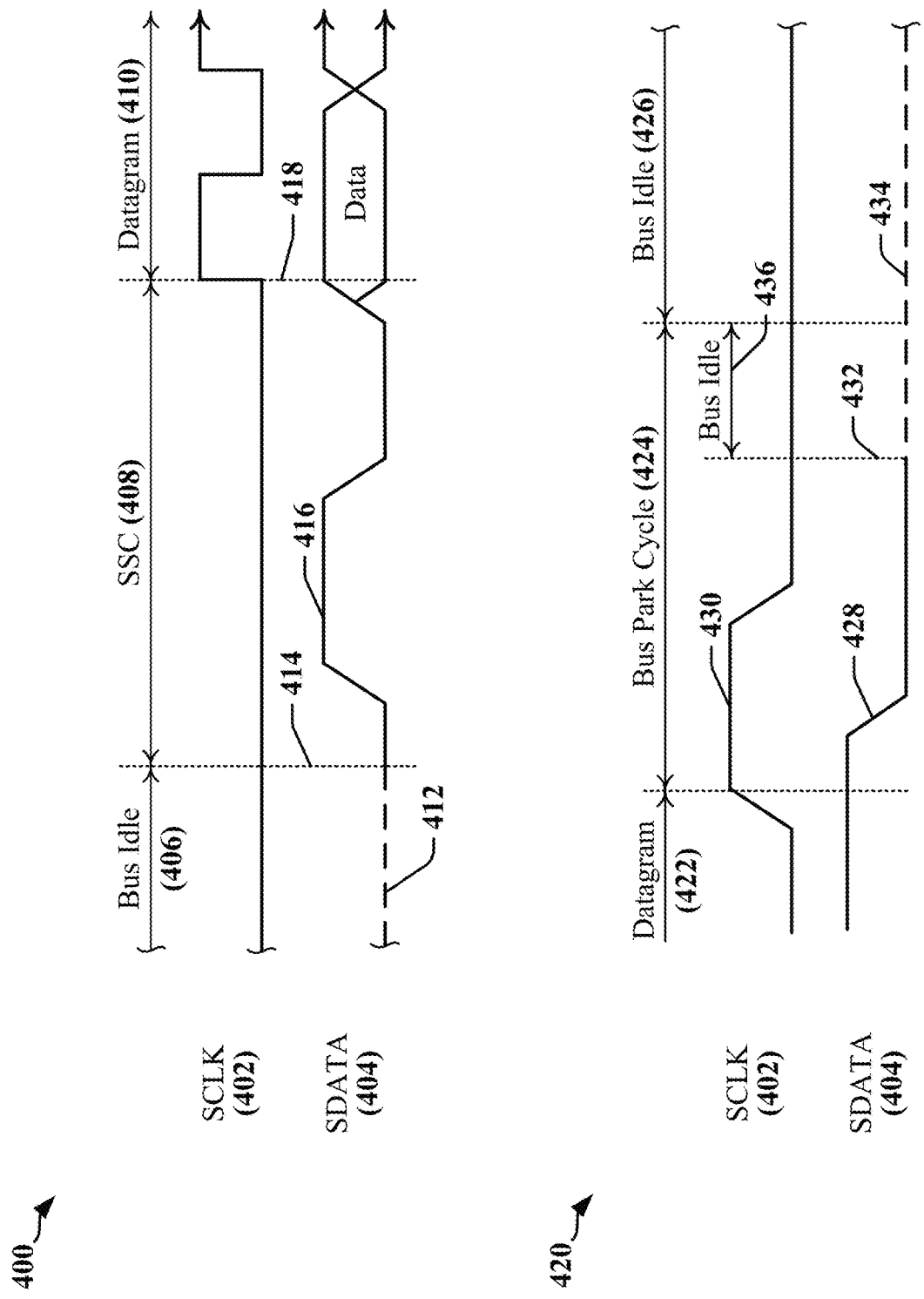
FIG. 4 includes timing diagrams that illustrate signaling transmitted to delineate the boundaries of RFFE and SPMI datagrams.

FIG. 4 includes timing diagrams 400, 420 that illustrate signaling that is transmitted to delineate the boundaries of datagrams transmitted in accordance with RFFE protocols. The timing diagrams 400, 420 show the relative timing of signals transmitted on a 2-wire serial bus that provides a clock signal on SCLK 402 and provides for exchange of data over SDATA 404. The first timing diagram 400 illustrates timing of a sequence start condition (SSC 408) that is transmitted to signal the start of a transaction such as the transmission of a datagram 410. The SSC 408 is transmitted when the serial bus is in an idle state 406. In the idle state 406, SCLK 402 is driven at full strength by a bus master while slave devices coupled to the serial bus present a high impedance to SCLK 402. SCLK 402 is held in the low signaling state (here, at zero volts) by the bus master. In the idle state 406, SDATA 404 is weakly driven by the bus master or is held in the weakly driven low signaling state 412 using a keeper circuit or a weak pull-down circuit. A keeper circuit or a weak pull-down circuit may maintain the signaling state of SDATA 404, for example, when the bus master has caused its line driver to enter a high impedance state and when no other device is driving SDATA 404. The weakly driven low signaling state 412 can easily be overcome by another line driver that can drive SDATA 404 at full strength.

In a master-driven SSC 408, the bus master commences transmission of the SSC 408 at a first point in time 414 when it begins to drive SDATA 404 at full strength, initially at the low signaling state. The bus master then provides a pulse 416 on SDATA 404 while continuing to drive SCLK 402 to the low signaling state. The pulse 416 has duration of at least one cycle of a clock signal provided on SCLK 402 during transmission of a datagram 410. At a second point in time 418, the bus master commences transmission of clock pulses on SCLK 402, thereby providing the clock signal used to control or indicate timing of a datagram 410 transmitted on SDATA 404.

The second timing diagram 420 illustrates timing of a bus park cycle (the BPC 424) that may be transmitted to signal the termination of a datagram 422, for example. The BPC 424 is transmitted by providing a falling edge 428 on SDATA 404 while SCLK 402 is in a high signaling state 430. By protocol, transitions on SDATA 404 during transmission of the datagram 422 are permitted only while the clock signal is in the low signaling state, and the falling edge 428 that occurs while SCLK 402 is in the high signaling state 430 is interpreted as control signaling (i.e., the BPC 424). The falling edge 428 is provided by the bus master driving SDATA 404 low at full strength. The bus master then drives SCLK 402 low and continues to drive SCLK 402 at full strength through subsequent bus idle intervals 426, 436. After driving SCLK 402 low, the bus master initiates a bus idle interval 436 at a time 432 when the bus master causes its line driver to enter the high impedance state. While no other device is driving SDATA 404, SDATA 404 remains in the weakly driven low signaling state 434. The BPC 424 is terminated and the serial bus enters a bus idle interval 426 until the next datagram is ready for transmission.

Figure 5:
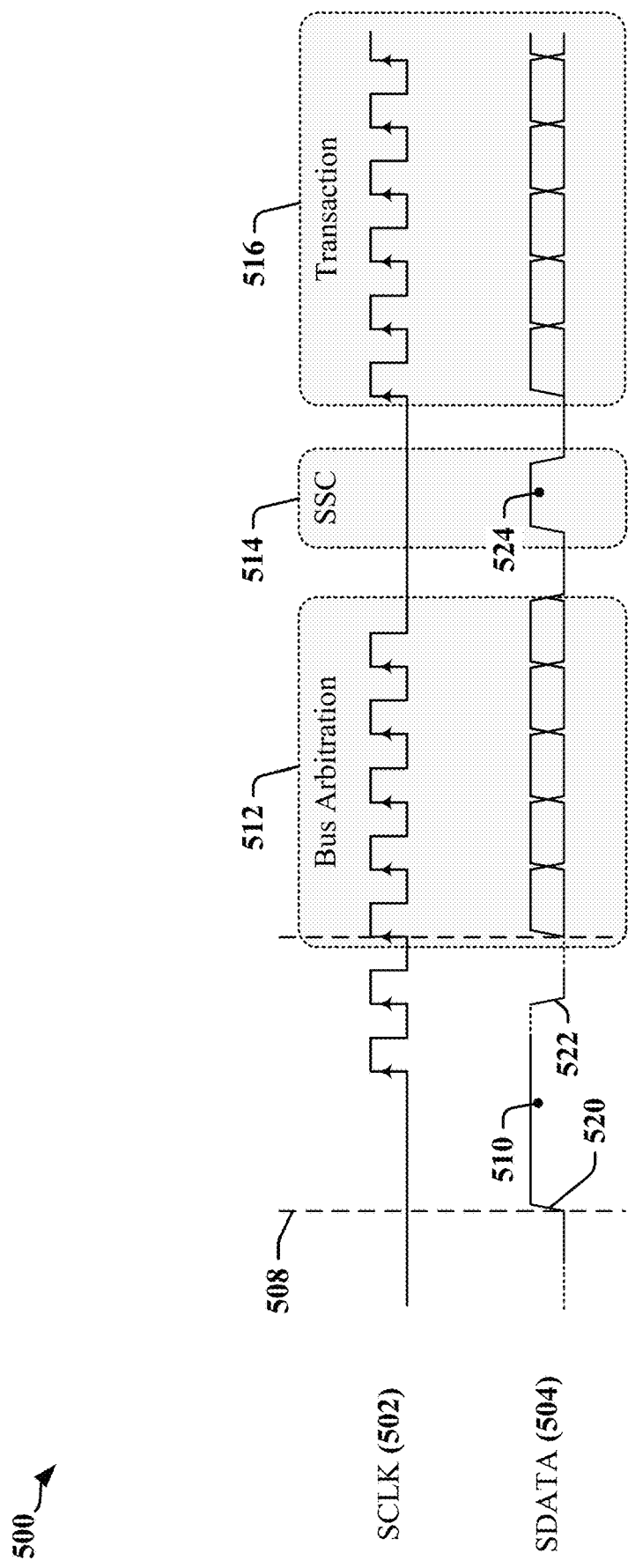
FIG. 5 illustrates certain aspects related to the timing of an RFFE transaction executed through a data communication link.

FIG. 5 illustrates certain aspects related to the timing of an RFFE transaction 500 executed through a data communication link. The transaction 500 commences at a time 508 with a bus arbitration procedure 512 in which an initiating device indicates a desire to write or read data over the data communication link by driving SDATA 504. The bus arbitration procedure 512 is performed to determine the highest-priority device seeking to use the data communication link. Device priority may be determined based on a device identifier and the highest-priority device participating in the bus arbitration procedure 512 is generally granted control of the data communication link. Initially, SDATA 504 is weakly driven by the bus master or is held in the weakly driven low signaling state using a keeper circuit or a weak pull-down circuit. A keeper circuit or a weak pull-down circuit may maintain the signaling state of SDATA 504, for example, when the bus master has caused its line driver to enter a high impedance state and when no other device is driving SDATA 504. The weakly driven low signaling state can easily be overcome by another line driver that can drive SDATA 504 at full strength.

At a point in time 508, the initiating device initiates a first pulse 510 on SDATA 504. Consistent with RFFE protocols, the current bus master provides a clock signal on SCLK 502 after detecting the rising edge 520, and the initiating device releases SDATA 504 during the first clock cycle. The bus master then drives SDATA 504 to provide the falling edge 522 of the first pulse 510 before configuring its line driver for high impedance mode and causing SDATA 504 to reenter the weakly driven low signaling state. Devices seeking control of the data communication link then attempt to transmit their respective addresses. Upon detecting a higher-priority address, a participating device withdraws from the bus arbitration procedure 512. A device that succeeds in transmitting its entire address wins the bus arbitration procedure 512. In the illustrated example, a Sequence Start Condition (the SSC 514) is transmitted after completion of the bus arbitration procedure 512 to commence a transaction 516 involving the winning device. According to some protocols, the winning device may control the transaction 516 and provides the SSC 514 by transmitting a second pulse 524 on the SDATA 504 while the clock signal on SCLK 502 is held in a low signaling state.

In accordance with certain aspects disclosed herein, a protocol used for controlling operation of a two-wire serial bus may be adapted to operate the serial bus in a one-wire mode. In one example, transactions conducted over the one-wire serial bus may be configured or formatted according to RFFE protocols. The single line of the one-wire serial bus is used as a data line for bidirectional transmission of control and data signaling. According to certain aspects of this disclosure timing for communication between one-wire slave devices coupled to the serial bus may be embedded in data transmissions and control signaling may be provided to synchronize clock signals at the transmitter and receiver.

Figure 6:
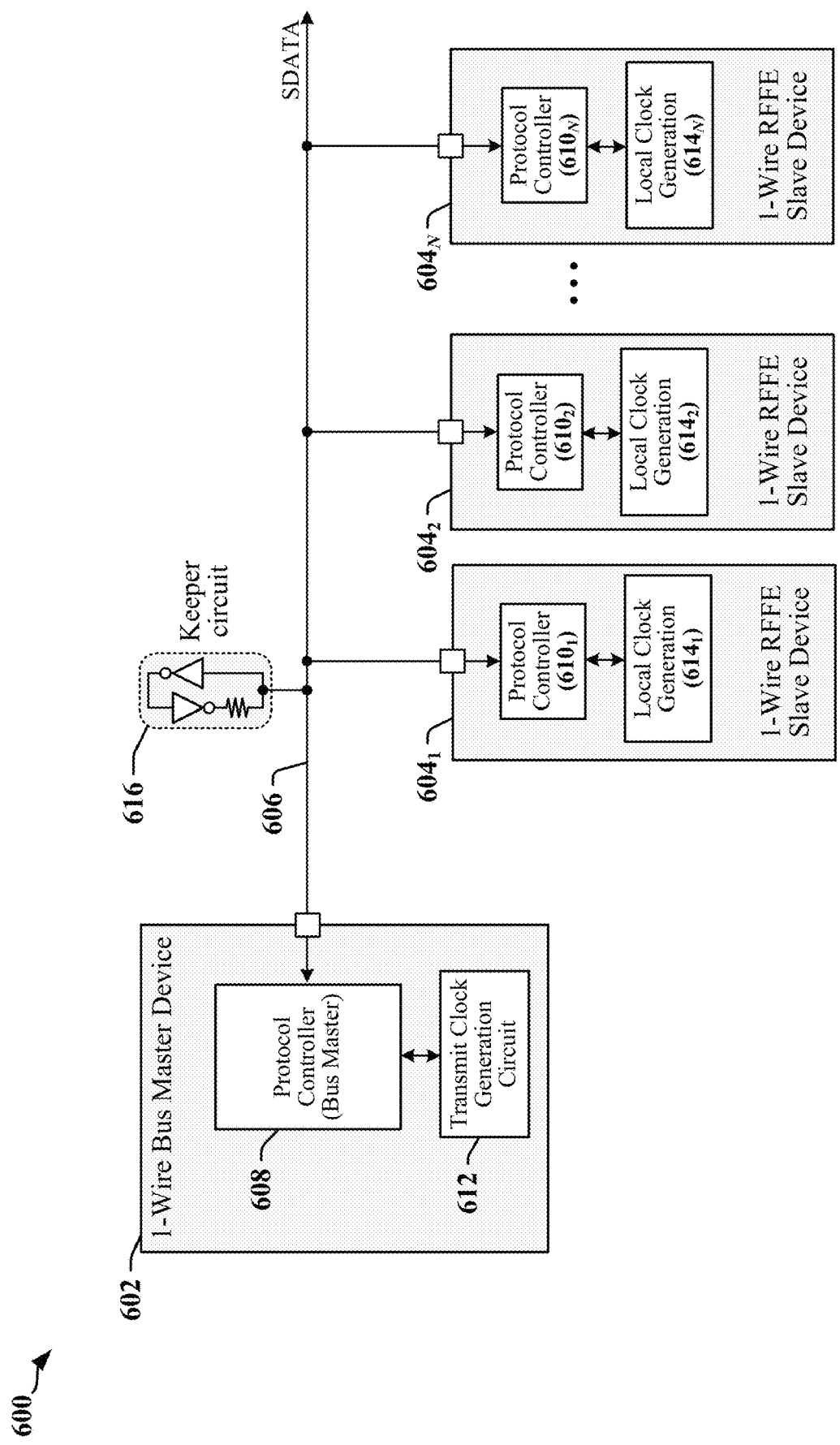
FIG. 6 illustrates a system in which a bus master device communicates with one or more one-wire slave devices in accordance with certain aspects disclosed herein.

FIG. 6 illustrates a system 600 in which a bus master device 602 communicates with one or more one-wire slave devices $604_1$-$604_N$ in accordance with certain aspects disclosed herein. The bus master device 602 may be provided in an RFIC, modem, application processor or another type of device. The bus master device 602 may be adapted to exchange data with the one-wire slave devices $604_1$-$604_N$ over a single wire, referred to as the SDATA line 606 in the illustrated system 600. Data is encoded in a signal transmitted over the SDATA line 606, where the signal includes embedded clock information that can be used by the receiving device to decode data from the signal.

The bus master device 602 and the one-wire slave devices $604_1$-$604_N$ typically include respective protocol controllers 608, $610_1$-$610_N$. The protocol controllers 608, $610_1$-$610_N$ may have a processor, controller, state machine or other logic circuits configured to support one or more protocols. The protocol controller 608 in the bus master device 602 may be further configured to manage communication over the SDATA line 606. In some instances, the protocol controller 608 performs some of the functions of a bus master. In some implementations, the protocol controller 608 in the bus master device 602 may be used to configure one or more of the one-wire slave devices $604_1$-$604_N$. The bus master device 602 may determine a configuration of a one-wire slave device $604_1$-$604_N$ that is a designated recipient of data to be transmitted over the SDATA line 606, and may cause the protocol controller 608 to encode data intended for the recipient one-wire slave device $604_1$-$604_N$ in a signal to be transmitted over the SDATA line 606 and addressed to the one-wire slave device $604_1$-$604_N$.

The bus master device 602 may include a transmit clock generator 612 that can be used to define timing for transmissions over the SDATA line 606. Each of the one-wire slave devices $604_1$-$604_N$ includes a local clock generation circuit $614_1$-$614_N$ that provides timing for the corresponding protocol controller $610_1$-$610_N$. The local clock generation circuits $614_1$-$614_N$ may be synchronized using synchronization pulses transmitted by the bus master device 602 after an SSC or transmitted by the bus master device 602 or by one of the one-wire slave devices $604_1$-$604_N$ after a line turnaround. In accordance with certain aspects of this disclosure, the local clock generation circuits $614_1$-$614_N$ may be synchronized using transitions in Manchester-encoded commands and data payloads transmitted over the SDATA line 606. The local clock generation circuits $614_1$-$614_N$ may include a ring oscillator or delay locked loop. In some implementations, the local clock generation circuits $614_1$-$614_N$ may include an injection-locked oscillator that responds to synchronizing pulses and/or the transitions in Manchester-encoded command and data payload transmissions.

A keeper circuit 616 may be coupled to the SDATA line 606 to facilitate line turnaround, in-band interrupt requests or arbitration procedures in accordance with certain aspects disclosed herein. In one example, the keeper circuit 616 may be configured as a positive feedback circuit that drives the SDATA line 606 through a high impedance output, and receives feedback from the SDATA line 606 through a low impedance input. The keeper circuit 616 may be configured to maintain the last asserted voltage on the SDATA line 606. The keeper circuit 616 can be easily overcome by an active line driver in the bus master device 602 or in one of the one-wire slave devices $604_1$-$604_N$.

Conventional implementations of 1-wire bidirectional communication buses have been hampered by restrictively slow data rates. Many conventional 1-wire bidirectional communication buses are limited to sub-megahertz (MHz) signaling rates and are unsuited to high-speed RF-Front End control applications which can require clock rates of up to 52 MHz. Some conventional 1-wire bidirectional communication buses attempt to increase data rates through the use of pulse-width modulation and other data encoding schemes. However, these latter communication buses are typically unable to obtain signaling rates greater than 4 MHz due to various limitations with PWM signaling, for example.

A 1-wire bidirectional communication bus implemented in accordance with certain aspects disclosed herein can achieve data rates of up to and beyond 52 MHz. In certain examples, a signaling scheme provided for communication over 1-wire communication buses uses a combination of RFFE protocols, Manchester encoding and modified control signaling that can indicate and distinguish between various types of transactions.

Figure 7:
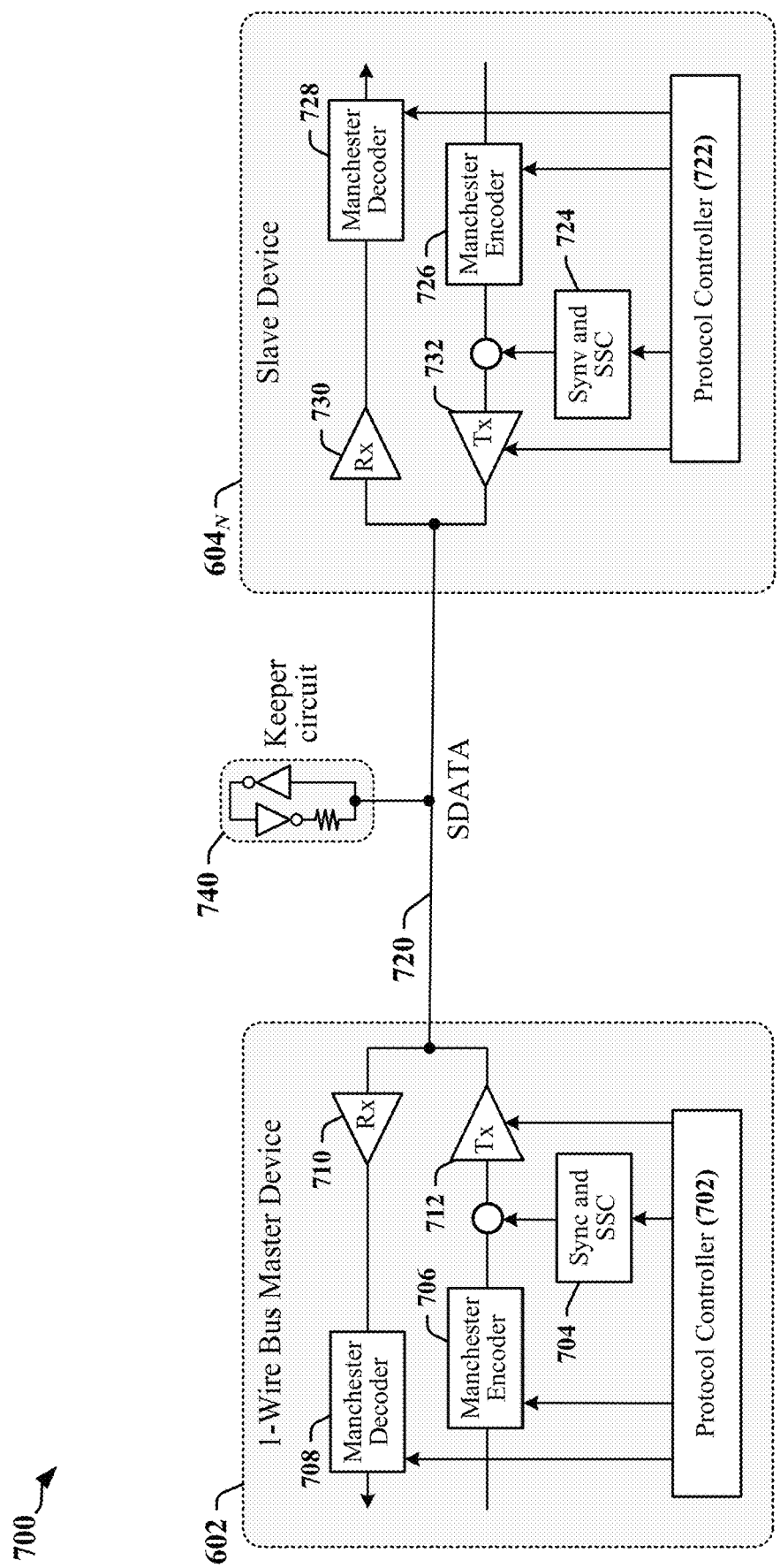
FIG. 7 illustrates an example of a 1-wire serial interface that may be configured in accordance with certain aspects of this disclosure.

FIG. 7 illustrates an example of a 1-wire serial interface 700 that may be configured in accordance with certain aspects of this disclosure. In the example, a bus master device 602 and one-wire slave device $604_N$ (see FIG. 6) are illustrated. The bus master device 602 includes a protocol controller 702. The protocol controller 702 may be implemented using a processor, microcontroller or finite state machine and may be used to control transmit and receive functions of the bus master device 602. The protocol controller 702 may include or be coupled to a signal generation circuit 704 that generates synchronization and SSC signals transmitted on the SDATA line 720 that couples the bus master device 602 to one or more slave devices $604_N$. The signal generation circuit 704 may be configured to generate different types of SSC to initiate arbitration, initiate data transfer or to abandon arbitration. The signal generation circuit 704 may be configured to generate synchronization pulses used to synchronize clock signals produced at the slave devices $604_N$ with a transmit clock signal generated in the bus master device 602.

The protocol controller 702 may be configured to selectively activate a Manchester encoder 706 and a Manchester decoder 708 based on mode of operation of the 1-wire serial interface 700. The Manchester decoder 708 may extract data and clock information from a signal received from the SDATA line 720. The protocol controller 702 may be further configured to format datagrams for transmission over the SDATA line 720. The protocol controller 702 may be further configured to generate commands to be transmitted over the SDATA line 720.

In the illustrated example, the one-wire slave device $604_N$ includes a protocol controller 722. The protocol controller 722 may be implemented using a processor, microcontroller or finite state machine and may be used to control transmit and receive functions of the one-wire slave device $604_N$. The protocol controller 722 may include or be coupled to a signal generation circuit 724 that generates synchronization pulses to be transmitted when the one-wire slave device $604_N$ is transmitting over the SDATA line 720. The protocol controller 722 may be further configured to cause the signal generation circuit 724 to drive the SDATA line 720 to initiate an SSC in an in-band interrupt procedure and may be further configured to cause the signal generation circuit 724 to drive the SDATA line during an arbitration procedure. The synchronization pulses generated by the signal generation circuit 704 may be configured to synchronize clock signals produced at the bus master device 602 with a transmit clock signal generated in the slave device $604_N$.

The protocol controller 722 may be configured to selectively activate a Manchester encoder 726 and a Manchester decoder 728 based on mode of operation of the 1-wire serial interface 700. The Manchester decoder 728 may extract data and clock information from a signal received from the SDATA line 720. The protocol controller 722 may be further configured to format datagrams for transmission over the SDATA line 720. The protocol controller 722 may be further configured to disassemble datagrams and/or respond to commands received from the SDATA line 720.

The protocol controller 702 may be configured to manage and control the operation of a line driver 712 and a line receiver 710. The protocol controller 722 may be configured to manage and control the operation of a line driver 732 and a line receiver 730. The line drivers 712, 732 may present a high impedance to the SDATA line 720 when inactivated or disabled. For example, the output of the line driver 712 in the bus master device 602 may present a high impedance to the SDATA line 720 when the one-wire slave device $604_N$ is configured or expected to transmit data or control signals over the SDATA line 720. The output of the line driver 732 in the one-wire slave device $604_N$ is typically in the high impedance state when the bus master device 602 is driving the SDATA line 720.

A keeper circuit 740 coupled to the SDATA line 720 facilitates line turnaround, in-band interrupt requests and arbitration procedures in a bidirectional 1-wire serial bus. It is often desired to maintain the state of the SDATA line 720 when all devices are in high impedance mode, during line turnarounds or in arbitration procedures. Line turnaround occurs when the bus master device 602 transitions from transmitting to receiving or from receiving to transmitting. During arbitration procedures, the bus master device 602 may enter high impedance mode when the one-wire slave device $604_N$ has the option to transmit and the line driver in the bus master device 602 may present a high impedance to the SDATA line 720 to avoid contention. The state of the SDATA line 720 may be maintained using the keeper circuit 740. In one example, the keeper circuit 740 may be configured as a positive feedback circuit that drives the SDATA line 720 through a high impedance output, and receives feedback from the SDATA line 720 through a low impedance input. The keeper circuit 740 may be configured to maintain the last asserted voltage on the SDATA line 720. The keeper circuit 740 can be easily overcome by the line drivers 712, 732 in the bus master device 602 and the one-wire slave device $604_N$, respectively.

Figure 8:
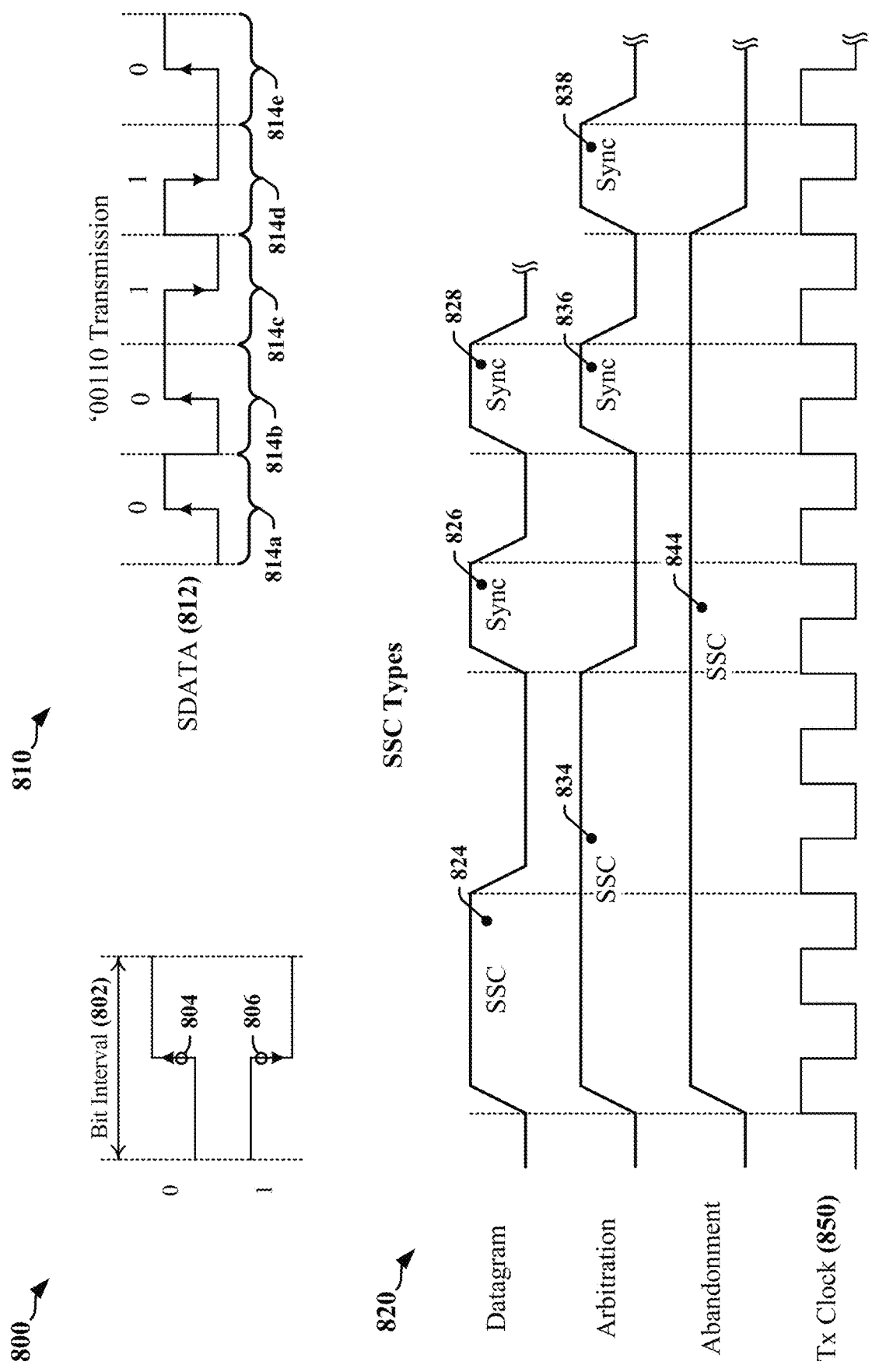
FIG. 8 illustrates certain aspects of Manchester encoding and control signaling that may be used to exchange data between a bus master device and one-wire slave devices in accordance with certain aspects of this disclosure.

FIG. 8 illustrates certain aspects of Manchester encoding and the control signaling that may be used to exchange data between the bus master device 602 and the one-wire slave devices $604_1$-$604_N$ over the SDATA line 606 (see FIG. 6) in accordance with certain aspects of this disclosure. As shown in the first timing diagram 800, Manchester encoding encodes data based on the direction of a transition occurring in the middle of a bit transmission interval 802. For example, a signal wire may be in a low state initially and a transition 804 to the high state indicates a '0' value bit. The signal wire may initially be in a high state and a transition 806 to the low state indicates a '1' value bit. Clock information is embedded in the data signal in the transitions that occur within every bit transmission interval 802.

The second timing diagram 810 illustrates five bit transmission intervals 814a-814e in a signal carried on SDATA 812. A sequence of bits {0, 0, 1, 1, 0} is transmitted in the five bit transmission intervals 814a-814e and illustrates the transitions within each of the five bit transmission intervals 814a-814e. It will be observed that transitions may occur at some boundaries between bit transmission intervals 814a-814e and that no transitions occur at the other boundaries between bit transmission intervals 814a-814e.

Control signaling provided in accordance with certain aspects of this disclosure can be used to indicate start of a datagram, clock synchronization, commencement of data exchange for both write and read datagrams and end of a datagram. In-band interrupts are accommodated under the control of a bus master device. The bus master device may affirmatively indicate that in-band interrupts are to be suppressed at the start of a transaction, or that in-band interrupts can be asserted by slave devices. The bus master device may further indicate that an arbitration procedure is to be abandoned when, for example, higher priority messages arrive for transmission over the 1-wire serial bus.

The third timing diagram 820 illustrates configuration of different SSCs 824, 834, 844 defined in accordance with certain aspects of this disclosure. Each of the SSCs 824, 834, 844 operates as a control signal that affects the use of a single-wire serial interface. For example, the SSCs 824, 834, 844 may be transmitted to signal the start of a transaction or termination of an arbitration procedure. The duration of the SSCs 824, 834, 844 can indicate whether the following transaction includes a datagram transmitted by the bus master device, commencement of an interrupt opportunity and/or arbitration procedure, abandonment of an arbitration procedure or another type of transmission. A first SSC 824 indicates that a datagram is being initiated without an opportunity for arbitration. In one example, the first SSC 824 may be provided when a high-priority message is to be transmitted over the 1-wire serial bus. In the illustrated example, the first SSC 824 has a duration of two cycles of a transmit clock signal 850. A second SSC 834 has a duration of four cycles of the transmit clock signal 850 and indicates an opportunity for arbitration. Any slave device that has data for transmission, or that has request for service may participate in the arbitration procedure. A third SSC 844 has a duration of eight cycles of the transmit clock signal 850 and indicates that the arbitration procedure has been abandoned. In some examples, the arbitration procedure is abandoned when higher priority messages become available and a transaction initiated using the first SSC 824 may follow the third SSC 844.

The number of clock cycles allocated for each of the SSCs 824, 834, 844 may be selected according to design requirements or through configuration by an application. In the illustrated example, the durations of the SSCs 824, 834, 844 ensure that the type of SSC 824, 834, 844 will not be confused even when the SSCs 824, 834, 844 are transmitted at the limit of specified tolerances. For example, RFFE protocols define a ±15% tolerance for a 52 MHz transmit clock signal 850. As can be seen from Table 1, there is no overlap in duration of the SSCs 824, 834, 844 when the transmit clock signal 850 lies within the tolerances defined by RFFE protocols.

TABLE 1

| | Tx Clock 850 | Cycle (ns) | SSC 824 | SSC 834 | SSC 844 |
|---|---|---|---|---|---|
| −15% | 44.2 MHz | 22.6 | 45.25 | 90.50 | 181.00 |
| Reference | 52 MHz | 19.2 | 38.46 | 76.92 | 153.85 |
| +15% | 59.8 MHz | 16.7 | 33.44 | 66.89 | 133.78 |

In other implementations, different durations may be defined for the SSCs 824, 834, 844.

In the illustrated example, the SSCs 824, 834 that immediately precede a datagram transmission are followed by a number of synchronization pulses 826, 828 or 836, 838. The synchronization pulses 826, 828 or 836, 838 are provided to enable clock generation circuits in the receivers to synchronize with the transmit clock signal 850. The synchronization pulses 826, 828 or 836, 838 can enable clock synchronization that includes frequency and phase synchronization. The number of synchronization pulses transmitted in sequence may be configured or selected based on application, receiver capabilities or under control of an application. The number of clock ticks may be selected to achieve clock frequency and phase synchronization of different types of clock generation circuits, including ring oscillators, delay locked loops and other circuits. The use of Manchester encoding permits clock phase adjustment to be performed in each bit transmission interval and can support long run datagrams without losing clock synchronization.

In certain aspects of this disclosure, a slave device may assert an in-band interrupt by driving the 1-wire serial bus high from an idle state. Slave devices may turn off their line driver to enable the bus master device to take control of the 1-wire serial bus. The bus master device may choose to deny arbitration and may drive SDATA low after two cycles of the transmit clock signal 850. The bus master device may choose to allow arbitration and may maintain SDATA in the high state for two more clock cycles to indicate commencement of arbitration.

In some examples, the in-band interrupt mechanism includes an arbitration procedure based on a "hand-raising" mechanism in which each slave device coupled to the single wire bus is assigned a slot within an arbitration period. The slot may have a duration of two cycles of the transmit clock signal 850 positioned within the arbitration period. A slave device participates in arbitration by driving SDATA high for one clock cycle within its pre-assigned slot. The slave device may then cause its line driver to enter a high impedance mode, allowing the bus master device to drive SDATA to the low signaling state before commencement of the next pre-assigned slot. The bus master device can identify and record each slave device that participated in arbitration and can service each participating slave device in accordance with device priority, queuing algorithm or based on priorities and parameters defined by an application or system configuration.

The bus master device may also abandon the arbitration using the third SSC 844. For example, the arbitration procedure can be abandoned by the bus master device in order to support a higher priority message. The bus master can retain the information identifying participating slave devices after abandonment of arbitration. The bus master device can subsequently begin interrupt service in any order defined by application or system configuration. In a conventional system, the bus master device can, at most, retain only the information identifying the slave device that won the arbitration procedure after abandoning the procedure.

In other examples, the arbitration procedure may be based on the RFFE arbitration procedure where participating slave devices attempt to transmit their respective unique device addresses under the constraint that a device will withdraw from arbitration upon recognizing that a higher-priority address is being transmitted. The arbitration procedure can be abandoned by the bus master device in order to support a higher priority message.

Figure 9:
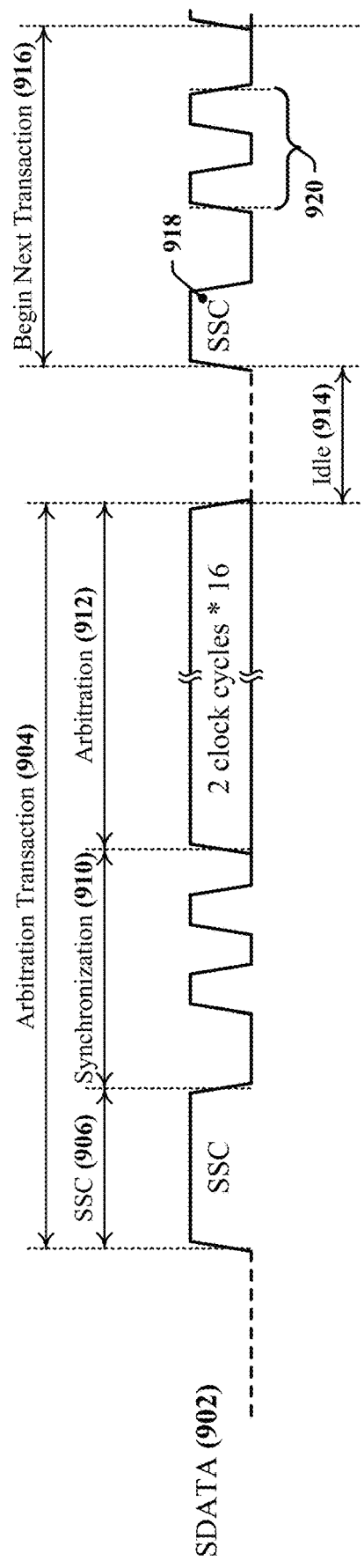
FIG. 9 includes a timing diagram that illustrates an arbitration transaction conducted on a 1-wire serial bus configured or adapted in accordance with certain aspects of the disclosure.

FIG. 9 includes a timing diagram 900 that illustrates an arbitration transaction 904 conducted on a 1-wire serial bus configured or adapted in accordance with certain aspects of the disclosure. The 1-wire serial bus has an interconnect or wire (SDATA 902) configured for carrying bidirectional data between two or more devices. A bus master device manages operation of the 1-wire serial bus by providing control signaling that can indicate, for example, start of a datagram, end of the datagram, start of an interruptible transaction, and abandonment of an interrupt processing (arbitration) procedure. The bus master device also employs signaling and encoding techniques configured to enable clock synchronization at the slave devices, and to enable data exchange during read and write operations. Control signaling based on SSC length can be used to accommodate interrupts as an integrated support feature of the bus architecture, and to abandon interrupt signaling in order to support processing of newly received higher priority messages.

In the illustrated example, the duration of an SSC 906 may be controlled by the bus master device. Initially, SDATA 902 is in an idle state, weakly driven low by the bus master or is held in the weakly driven low signaling state using, for example, the keeper circuit 616 or 740 illustrated in FIG. 6 and FIG. 7, or a weak pull-down circuit. A keeper circuit or a weak pull-down circuit may maintain the signaling state of SDATA 902, for example, when the bus master device has caused its line driver to enter a high impedance state and when no other device is driving SDATA 902. The weakly driven low signaling state can easily be overcome by an active line driver that can drive SDATA 902 at full strength, such as the line driver 712 in the bus master device 602 or the line driver 732 in one of the one-wire slave device 604$_N$.

The bus master device may initiate the SSC 906 or one or more slave devices may drive SDATA 902 to initiate the SSC 906 during a bus idle period by driving SDATA 902 high. In instances where the SSC 906 is initiated by a slave device, the slave device may initiate the SSC 906 after SDATA 902 has been idled for a minimum period of time defined by protocol and/or preconfigured during system initialization. The slave device is expected to release SDATA 902 by causing its line driver coupled to SDATA 902 to present a high impedance to SDATA 902 within one clock cycle of an internally generated clock signal. The signaling of SDATA 902 may be maintained by a keeper circuit after the line driver in the slave device has entered high impedance mode. The bus master is configured to activate its line driver coupled to SDATA 902 after approximately one clock cycle of its transmit clock signal. The bus master device may terminate the SSC 906 by driving SDATA 902 low to indicate a type of transaction to be performed. In some examples, the bus master device terminates the SSC 906 after two cycles of the transmit clock in order to indicate that no bus arbitration procedure is to be performed, and/or to indicate that a read or write transaction is to be initiated by the bus master device. The arbitration procedure may be suppressed when, for example, the bus master device determines that a higher priority message is available for transmission, when the bus master device determines that the arbitration procedure or subsequent transmission of a datagram would interfere with a scheduled message or command, or for other reasons defined by application or system configuration. In the illustrated example, the bus master device terminates the SSC 906 after 4 cycles of the transmit clock, indicating that an arbitration procedure is to be performed.

The bus master device may transmit one or more synchronization pulses after terminating the SSC 906. The number of synchronization pulses transmitted may be selected based on capabilities of the receiving device. In the illustrated example, the bus master device transmits two synchronization pulses 910 after terminating the SSC 906. The synchronization pulses 910 can be used by the receiving device to synchronize a local clock generation circuit. In one example, the local clock generation circuit includes a ring oscillator. In another example, the local clock generation circuit includes a delay locked loop. The clock pulses may be provided to an injection locking circuit of the local clock generation circuit. The number of pulses in the synchronization pulses 910 may be configured during manufacture, system integration or configuration and/or by an application or bus master device.

The synchronization pulses 910 may precede an arbitration period 912. In some instances, the arbitration period 912 provides a two-cycle slot for each slave address registered at the bus master or coupled to the 1-wire serial bus. In one example, the arbitration period 912 accommodates 8 devices and has a duration of 16 cycles of the transmit clock used by the bus master device. The bus master device may cause its line driver to enter a high impedance state at the beginning of each slot in the arbitration period 912 and the signaling state of SDATA 902 is maintained by the keeper circuit or weak pull-down circuit until a line driver coupled to SDATA 902 begins to actively drive SDATA 902.

A slave device can participate in the bus arbitration by driving SDATA 902 high during the first cycle of its corresponding slot in the arbitration period 912. The participating slave device then causes its line driver to enter a high impedance state before the end of the first cycle of the slot. SDATA 902 remains in the high state due to the operation of a keeper circuit or due to the bus master device activating its line driver to maintain SDATA 902 in the high state for the complete first cycle. The bus master device drives SDATA 902 low in the second cycle of the slot to permit the next slave device to unambiguously signal participation in arbitration. The bus master device identifies each device that drove SDATA 902 high during its corresponding slot in the arbitration period 912 as a device seeking service. The bus master device may then schedule servicing of the participant slave devices in an order determined by priority or sequence configured for the system. In the event that the bus master device abandons the arbitration process by transmitting an 8-cycle SSC, the bus master device can retain the information identifying participant slave devices in the arbitration period 912 and may schedule servicing based on the identifying information.

The bus master device may idle SDATA 902 for a period of time 914 after the arbitration period 912 and before initiating a next transaction 916. SDATA 902 may be idled when the bus master device causes its line driver to enter a high impedance state. In the illustrated example, the next transaction 916 commences with a 2-cycle SSC 918 to indicate that arbitration is not enabled. The transaction 916 continues with transmission of synchronization pulses 920 that can be used by the receiving device to synchronize its local clock generation circuit.

According to certain aspects of the disclosure, control signaling provided by the bus master device can indicate start of a datagram, end of the datagram, start of an interruptible transaction, and abandonment of an interrupt processing procedure. The datagram may also be referred to as a frame or may be provided within a frame that includes arbitration or other datagrams. The control signaling provided by the bus master device can indicate start of frame (SoF) or end of frame (EoF). Signaling and encoding techniques can be configured to enable clock synchronization, and data exchange for both read and write operations. Control signaling based on SSC length can be used to accommodate interrupts as an integrated support feature of the bus architecture, and to abandon interrupt signaling in order to support processing of newly received higher priority messages.

Figure 10:
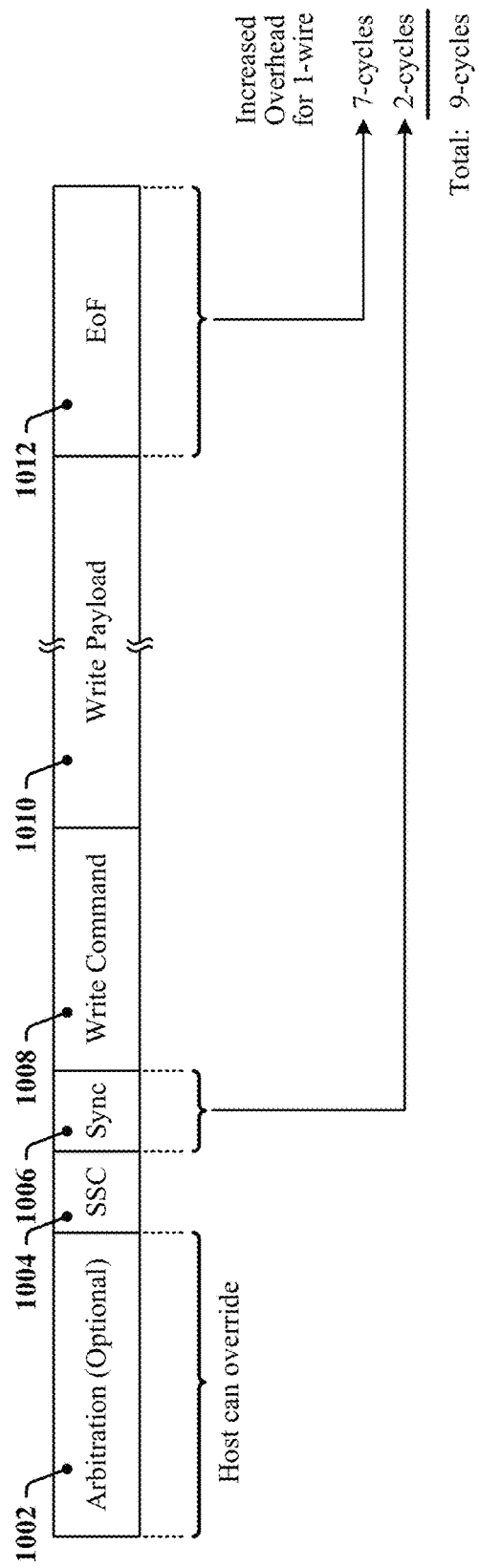
FIG. 10 illustrates a write transaction executed on a 1-wire serial bus configured in accordance with certain aspects disclosed herein.

FIG. 10 illustrates a write transaction 1000 executed on a 1-wire serial bus configured in accordance with certain aspects disclosed herein. The write transaction 1000 may include an arbitration transaction 1002 that enables slave devices to indicate a request for service. The arbitration transaction 1002 may be suppressed when, for example, the bus master device determines that a higher priority message is available for transmission, or to service devices identified in a previous arbitration procedure. The bus master device may transmit a 2-cycle SSC 1004 to indicate that arbitration is not enabled. The write transaction 1000 continues with transmission of synchronization pulses 1006 that can be used by the receiving device to synchronize its local clock generation circuit. A write command 1008 is transmitted. The write command 1008 may have a structure and content compatible or compliant with one or more commands defined by RFFE protocols. The write command 1008 may be encoded using Manchester encoding. The bus master device then transmits a payload 1010 that is directed to a device identified in the write command 1008. The payload 1010 may be encoded using Manchester encoding. The write transaction 1000 is terminated by an EoF 1012. In some instances, the EoF 1012 may be indicated by SDATA being idle for a number of cycles. In one example, the EoF 1012 is indicated when SDATA is idle for 7 cycles of the transmit clock.

The illustrated write transaction 1000 includes additional overhead with respect to a corresponding write transaction conducted over a conventional 2-wire serial bus operated in accordance with RFFE protocols. The additional overhead can be attributed to transmission of the synchronization pulses 1006 and the EoF 1012. In the illustrated example, the additional overhead may be calculated as 9 cycles of the transmit clock.

Figure 11:
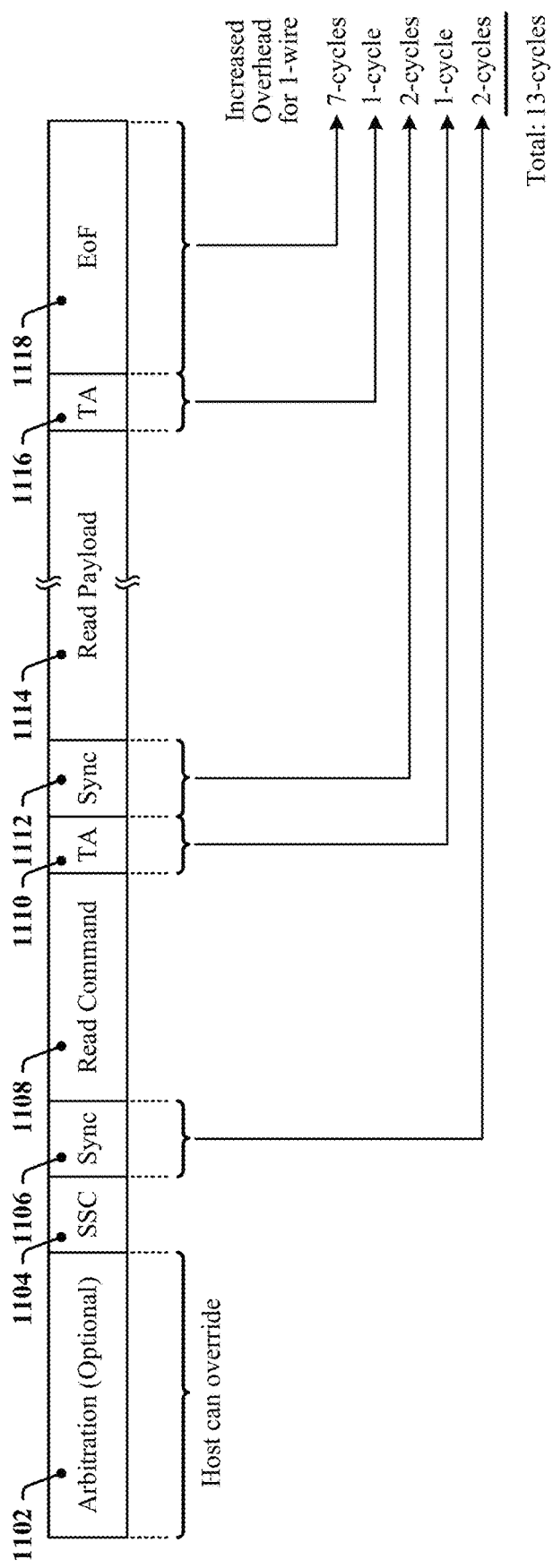
FIG. 11 illustrates a read transaction executed on a 1-wire serial bus configured in accordance with certain aspects disclosed herein.

FIG. 11 illustrates a read transaction 1100 executed on a 1-wire serial bus configured in accordance with certain aspects disclosed herein. The read transaction 1100 may include an arbitration transaction 1102 that enables slave devices to indicate a request for service. The arbitration transaction 1102 may be suppressed when, for example, the bus master device determines that a higher priority message is available for transmission. The bus master device may transmit a 2-cycle SSC 1104 to indicate that arbitration is not enabled. The read transaction 1100 continues with transmission of synchronization pulses 1106 that can be used by the receiving device to synchronize its local clock generation circuit. A read command 1108 is transmitted. The read command 1108 may have a structure and content compatible or compliant with one or more commands defined by RFFE protocols. The read command 1108 may be encoded using Manchester encoding.

The bus master device provides a turnaround period 1110 during which the bus master device causes its line driver to enter a high impedance state and the slave device addressed by the read command 1108 activates its line driver. In one example, the turnaround period 1110 includes two cycles of the transmit clock signal. The bus master is configured to disable its line driver in the first clock cycle of the turnaround period 1110, and the addressed slave device enables its line driver in the second clock cycle of the turnaround period 1110. The slave device transmits synchronization pulses 1112 that can be used by the bus master device to synchronize its transmit clock generation circuit to the local clock generation circuit of the addressed slave device. The slave device then transmits a payload 1114. The payload 1114 may be encoded using Manchester encoding.

A second turnaround period 1116 is provided. During the second turnaround period 1116, the slave device addressed by the read command 1108 causes its line driver to enter a high impedance state and the bus master device activates its line driver. In one example, the turnaround period 1116 includes two cycles of the transmit clock signal and the addressed slave device is configured to disable its line driver in the first clock cycle and the bus master enables its line driver in the second clock cycle. The read transaction 1100 is terminated by an EoF 1118. In some instances, the EoF 1118 may be indicated by SDATA being idle for a number of cycles. In one example, the EoF 1118 is indicated when SDATA is idle for 7 cycles of the transmit clock.

The illustrated read transaction 1100 includes additional overhead with respect to a corresponding read transaction conducted over a conventional 2-wire serial bus operated in accordance with RFFE protocols. The additional overhead can be attributed to transmission of the synchronization pulses 1106, 1112, the turnaround periods 1110, 1116 and the EoF 1118. In the illustrated example, the additional overhead may be calculated as 13 cycles of the transmit clock.

In the various examples provided herein, the example of a 1-wire serial bus is described in which data and commands are configured in accordance with an RFFE protocol. The RFFE protocol is used to illustrate certain aspects of the disclosure. The 1-wire serial bus may be operated in accordance with a different type of serial multidrop protocol, including an SPMI protocol or an I3C protocol, for example. Certain aspects of the serial multidrop protocol selected to control and manage transmissions over the 1-wire serial bus may be adapted, configured or modified to support arbitration, line turnaround and transmissions executed without an explicit clock reference such as a clock signal transmitted on a dedicated clock wire.

For example, a modified RFFE protocol may include certain capabilities or adaptations used to control operation of a 1-wire serial bus, including providing a bus master with the ability to selectively signal and launch an arbitration cycle that permits slave devices to post in-band interrupts. The bus master may also launch an SSC pulse configured to initiate a datagram without the possibility of interrupt and without bus arbitration. The modified RFFE protocol may provide for a programmable or configurable number of synchronization pulses that correspond to cycles of the internal clock signal of a transmitter clock to facilitate clock synchronization at the receiver. The modified RFFE protocol may implement a timeslot-based arbitration scheme in which each device has a pre-assigned slot in which it can assert an interrupt. In one example of such a "hand-raising" arbitration scheme, the pre-assigned timeslots are assigned by device address. The modified RFFE protocol may use Manchester encoding to ensure continuous clock frequency and phase synchronization. The modified RFFE protocol may define a line-turnaround procedure that includes transmission of synchronization pulses to ensure that the receiver is synchronized to the transmitter after a line turnaround event.

The modified protocol can define an interrupt and arbitration window under bus master control and can accommodate a wide variation in transmission rates, including variations measured at ±15% of the transmitter clock signal frequency.

Examples of Processing Circuits and Methods

Figure 12:
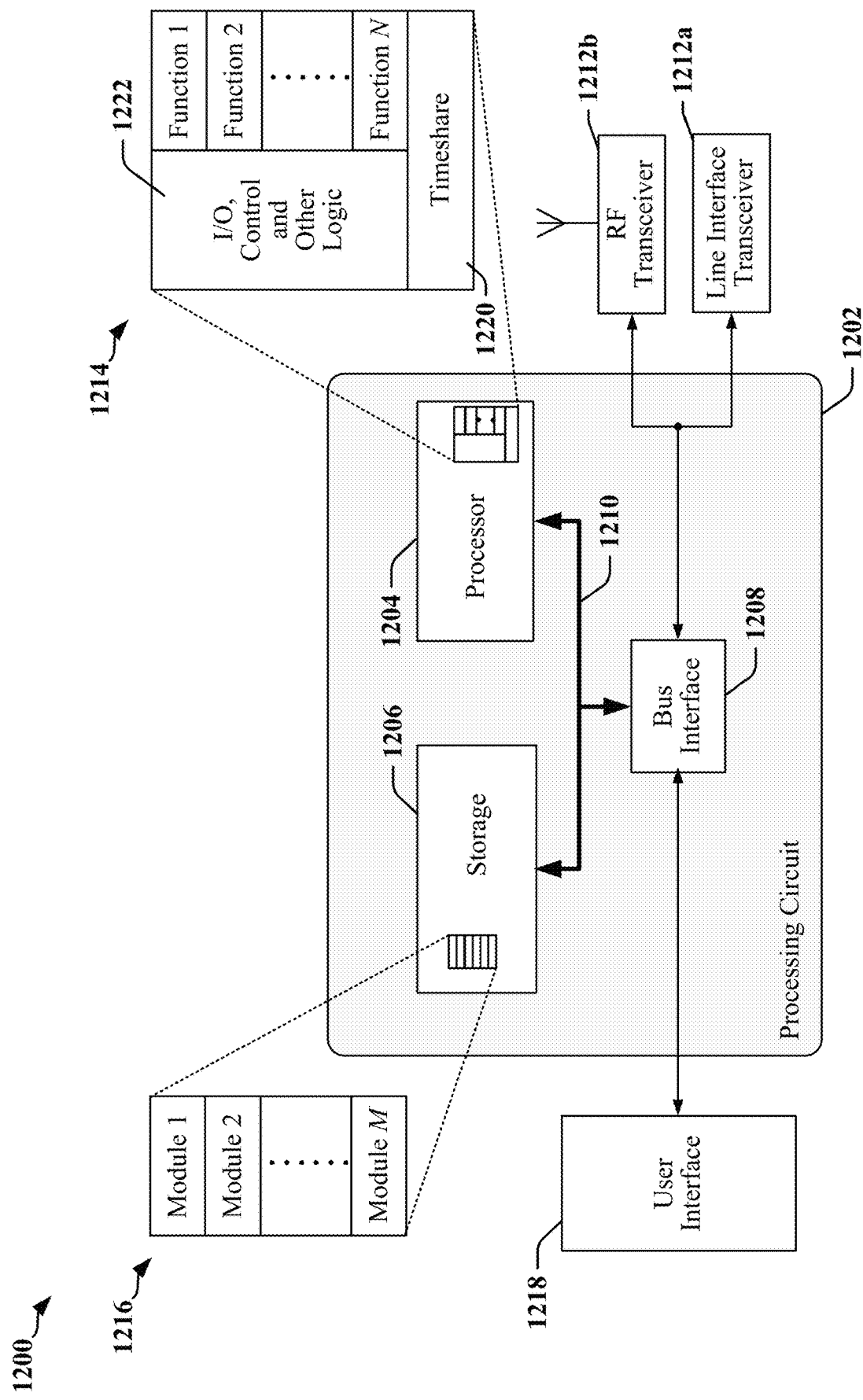
FIG. 12 illustrates one example of an apparatus employing a processing circuit that may be adapted according to certain aspects disclosed herein.

FIG. 12 is a diagram illustrating an example of a hardware implementation for an apparatus 1200. In some examples, the apparatus 1200 may perform one or more functions disclosed herein. In accordance with various aspects of the disclosure, an element, or any portion of an element, or any combination of elements as disclosed herein may be implemented using a processing circuit 1202. The processing circuit 1202 may include one or more processors 1204 that are controlled by some combination of hardware and software modules. Examples of processors 1204 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1204 may include specialized processors that perform specific functions, and that may be configured, augmented or controlled by one of the software modules 1216. The one or more processors 1204 may be configured through a combination of software modules 1216 loaded during initialization, and further configured by loading or unloading one or more software modules 1216 during operation.

In the illustrated example, the processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including the one or more processors 1204, and storage 1206. Storage 1206 may include memory devices and mass storage devices, and may be referred to herein as computer-readable media and/or processor-readable media. The bus 1210 may also link various other circuits such as timing sources, timers, peripherals, voltage regulators, and power management circuits. A bus interface 1208 may provide an interface between the bus 1210 and one or more transceivers 1212a, 1212b. A transceiver 1212a, 1212b may be provided for each networking technology supported by the processing circuit. In some instances, multiple networking technologies may share some or all of the circuitry or processing modules found in a transceiver 1212a, 1212b. Each transceiver 1212a, 1212b provides a means for communicating with various other apparatus over a transmission medium. In one example, a transceiver 1212a may be used to couple the apparatus 1200 to a multi-wire bus. In another example, a transceiver 1212b may be used to connect the apparatus 1200 to a radio access network. Depending upon the nature of the apparatus 1200, a user interface 1218 (e.g., keypad, display, speaker, microphone, joystick) may also be provided, and may be communicatively coupled to the bus 1210 directly or through the bus interface 1208.

A processor 1204 may be responsible for managing the bus 1210 and for general processing that may include the execution of software stored in a computer-readable medium that may include the storage 1206. In this respect, the processing circuit 1202, including the processor 1204, may be used to implement any of the methods, functions and techniques disclosed herein. The storage 1206 may be used for storing data that is manipulated by the processor 1204 when executing software, and the software may be configured to implement any one of the methods disclosed herein.

One or more processors 1204 in the processing circuit 1202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1206 or in an external computer-readable medium. The external computer-readable medium and/or storage 1206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1206 may also include, by way of example, a carrier wave, a transmission line, and any other suitable medium for transmitting software and/or instructions that may be accessed and read by a computer. Computer-readable medium and/or the storage 1206 may reside in the processing circuit 1202, in the processor 1204, external to the processing circuit 1202, or be distributed across multiple entities including the processing circuit 1202. The computer-readable medium and/or storage 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1206 may maintain software maintained and/or organized in loadable code segments, modules, applications, programs, etc., which may be referred to herein as software modules 1216. Each of the software modules 1216 may include instructions and data that, when installed or loaded on the processing circuit 1202 and executed by the one or more processors 1204, contribute to a run-time image 1214 that controls the operation of the one or more processors 1204. When executed, certain instructions may cause the processing circuit 1202 to perform functions in accordance with certain methods, algorithms and processes described herein.

Some of the software modules 1216 may be loaded during initialization of the processing circuit 1202, and these software modules 1216 may configure the processing circuit 1202 to enable performance of the various functions disclosed herein. For example, some software modules 1216 may configure internal devices and/or logic circuits 1222 of the processor 1204, and may manage access to external devices such as a transceiver 1212a, 1212b, the bus interface 1208, the user interface 1218, timers, mathematical coprocessors, and so on. The software modules 1216 may include a control program and/or an operating system that interacts with interrupt handlers and device drivers, and that controls access to various resources provided by the processing circuit 1202. The resources may include memory, processing time, access to a transceiver 1212a, 1212b, the user interface 1218, and so on.

One or more processors 1204 of the processing circuit 1202 may be multifunctional, whereby some of the software modules 1216 are loaded and configured to perform different functions or different instances of the same function. The one or more processors 1204 may additionally be adapted to manage background tasks initiated in response to inputs from the user interface 1218, the transceiver 1212a, 1212b, and device drivers, for example. To support the performance of multiple functions, the one or more processors 1204 may be configured to provide a multitasking environment, whereby each of a plurality of functions is implemented as a set of tasks serviced by the one or more processors 1204 as needed or desired. In one example, the multitasking environment may be implemented using a timesharing program 1220 that passes control of a processor 1204 between different tasks, whereby each task returns control of the one or more processors 1204 to the timesharing program 1220 upon completion of any outstanding operations and/or in response to an input such as an interrupt. When a task has control of the one or more processors 1204, the processing circuit is effectively specialized for the purposes addressed by the function associated with the controlling task. The timesharing program 1220 may include an operating system, a main loop that transfers control on a round-robin basis, a function that allocates control of the one or more processors 1204 in accordance with a prioritization of the functions, and/or an interrupt driven main loop that responds to external events by providing control of the one or more processors 1204 to a handling function.

The processing circuit 1202 may be configured to perform one or more of the functions disclosed herein. For example, the processing circuit 1202 may be configured to operate as a master device coupled to a serial bus. The processing circuit 1202 may be configured to initiate a pulse on a wire coupling the processing circuit 1202 to a slave device, present a high impedance to the wire after initiating the pulse and determine whether a slave device has terminated the pulse early, indicating a first encoded value. When the slave device has not terminated the pulse, processing circuit 1202 may be configured to terminate the pulse after a duration of time sufficient to indicate a second encoded value. In one example, the first encoded value is assigned binary 1 and the second encoded value is assigned binary 0. In another example, the first encoded value is assigned binary 0 and the second encoded value is assigned binary 1. The processing circuit 1202 may be configured to determine the encoded value or may employ a separate PWM decoder.

Figure 13:
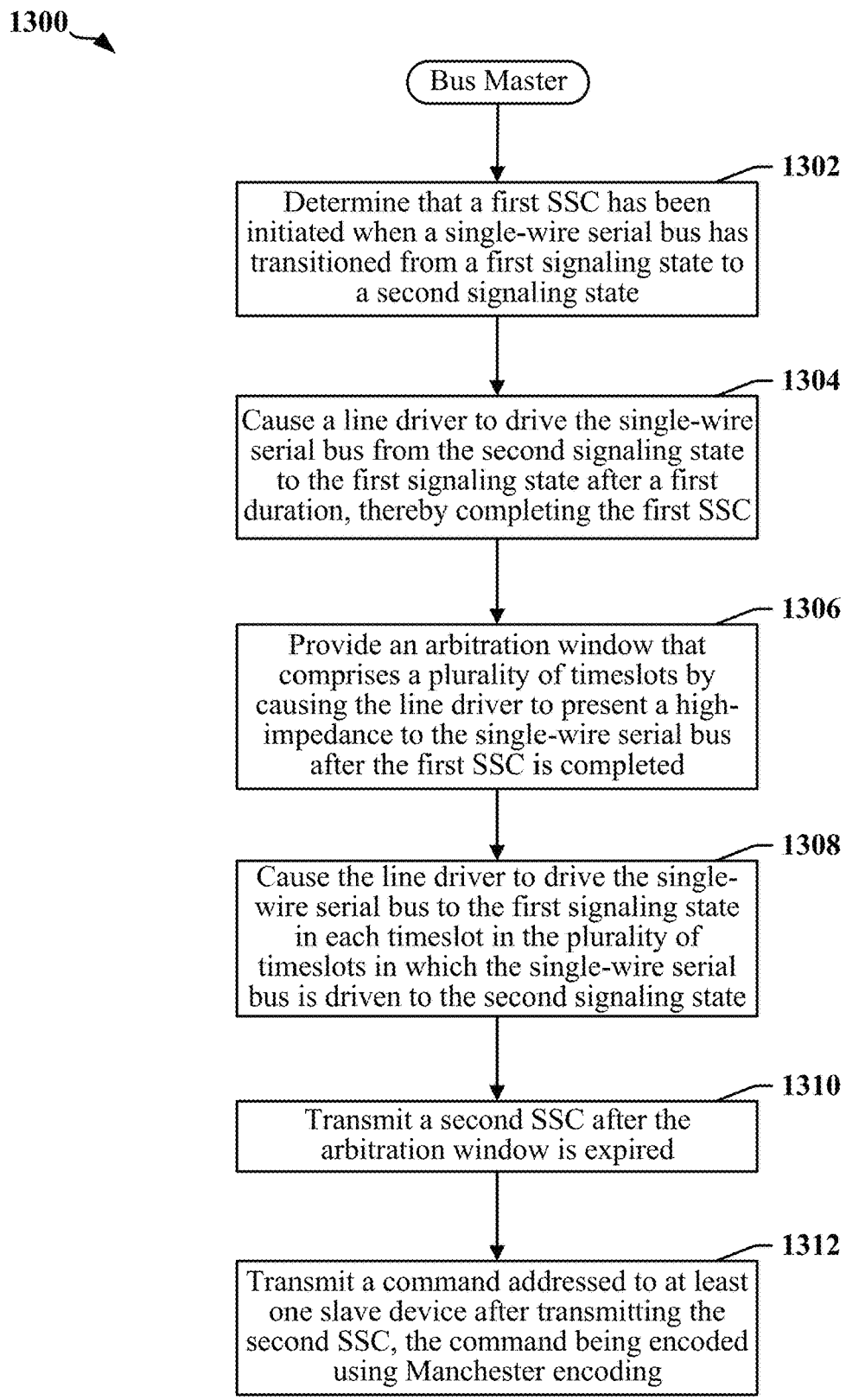
FIG. 13 is a first flowchart that illustrates a method for data communication at a bus master device in accordance with certain aspects disclosed herein.

FIG. 13 is a flowchart 1300 of a method of data communication that may be performed at a bus master device coupled to a single-wire serial bus. One or more slave devices may be coupled to the single-wire serial bus. The bus master device may exchange Manchester-encoded data with slave devices. The bus master device may transmit Manchester-encoded commands to the slave devices. At block 1302, the bus master device may determine that a first SSC has been initiated when a single-wire serial bus has transitioned from a first signaling state to a second signaling state. At block 1304, the bus master device may cause a line driver to drive the single-wire serial bus from the second signaling state to the first signaling state after a first duration, thereby completing the first SSC.

At block 1306, the bus master device may provide an arbitration window that includes a plurality of timeslots. The arbitration window may be provided when the bus master device causes the line driver to present a high impedance to the single-wire serial bus after the first SSC is completed. At block 1308, the bus master device may cause the line driver to drive the single-wire serial bus to the first signaling state in each timeslot in the plurality of timeslots in which the single-wire serial bus is driven to the second signaling state. At block 1310, the bus master device may transmit a second SSC after the arbitration window is expired and, at block 1312, the bus master device may transmit a command addressed to at least one slave device after transmitting the second SSC. The second SSC may have a second duration that is different from the first duration. The command may be encoded using Manchester encoding. In some instances, the command is formatted in accordance with an RFFE protocol.

In one example, the bus master device may initiate the first SSC by causing the line driver to drive the single-wire serial bus to the second signaling state to terminate an idle state of the single-wire serial bus. A keeper circuit coupled to the single-wire serial bus may be used or operable to maintain signaling state of the single-wire serial bus when the single-wire serial bus is undriven. The single-wire serial bus is undriven when no device is actively driving the single-wire serial bus.

In certain examples, the bus master device may provide one or more synchronization pulses on the single-wire serial bus after terminating the first SSC. The bus master device may provide one or more synchronization pulses on the single-wire serial bus after transmitting the second SSC.

In certain examples, the bus master device transmits a Manchester encoded data payload over the single-wire serial bus when the command comprises a write command. The bus master device may receive a Manchester encoded data payload from the single-wire serial bus when the command comprises a read command.

In some instances (when a read command is transmitted, for example) the bus master device provides a line turnaround interval by causing the line driver to present a high impedance to the single-wire serial bus after transmitting the command. The bus master device may synchronize an internal clock signal using one or more synchronization pulses received from the single-wire serial bus after the line turnaround interval. The bus master device may maintain synchronization of phase or frequency of the internal clock signal based on transitions in the Manchester encoded payload.

Figure 14:
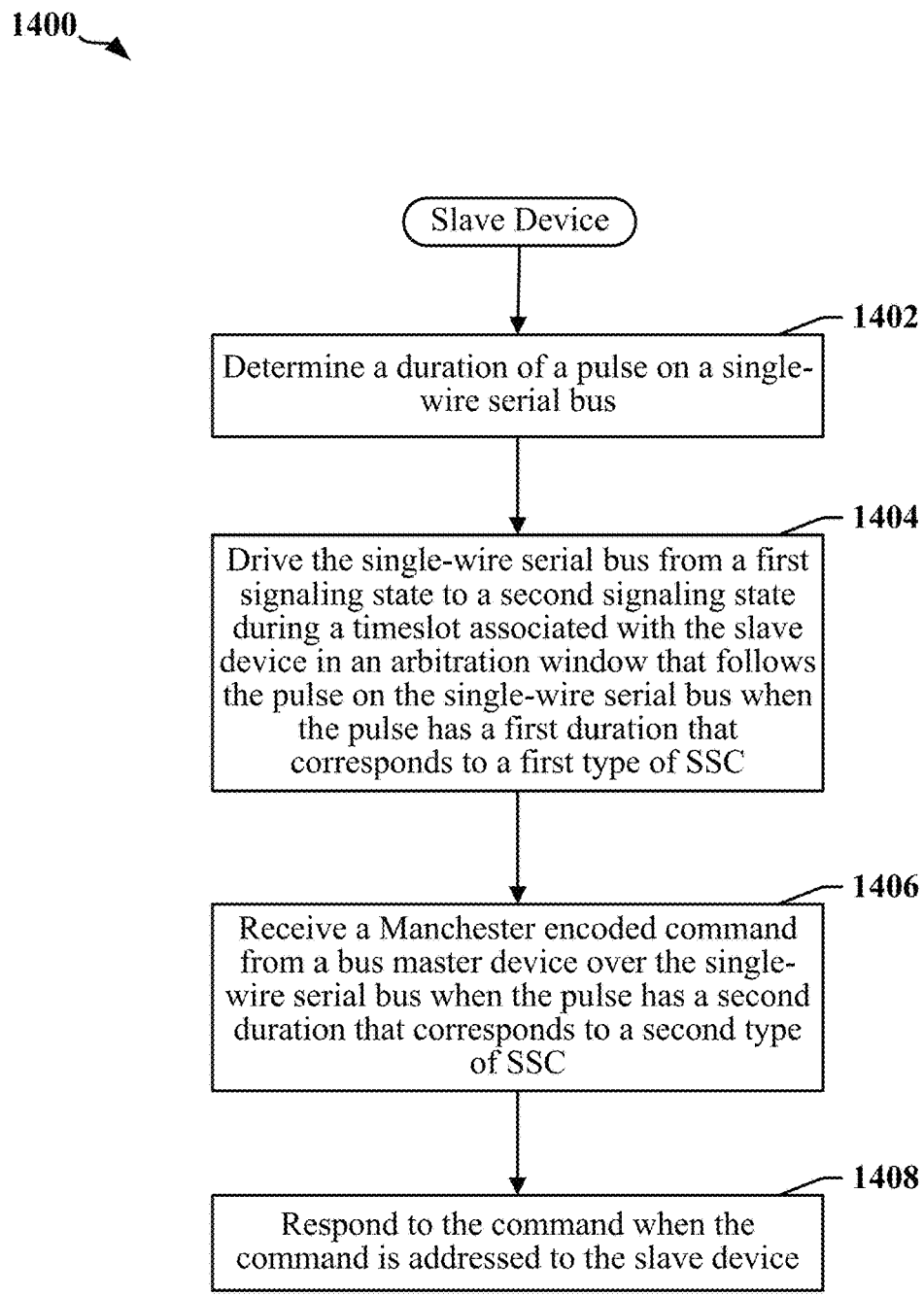
FIG. 14 is a second flowchart that illustrates a method for data communication at a bus slave device in accordance with certain aspects disclosed herein.

FIG. 14 is a flowchart 1400 of a method that may be performed by a slave device coupled to a single-wire serial bus. One or more slave devices may be coupled to the single-wire serial bus. The slave devices may receive Manchester-encoded commands from the bus master device and may exchange Manchester-encoded data with the bus master device in response to the commands.

At block 1402, the slave device may determine a duration of a pulse on a single-wire serial bus. At block 1404, the slave device may drive the single-wire serial bus from a first signaling state to a second signaling state during a timeslot associated with the slave device in an arbitration window that follows the pulse on the single-wire serial bus when the pulse has a first duration that corresponds to a first type of SSC. At block 1406, the slave device may receive a Manchester encoded command from a bus master device over the single-wire serial bus when the pulse has a second duration that corresponds to a second type of SSC. In some examples, the command is formatted in accordance with RFFE protocols. At block 1408, the slave device may respond to the command when the command is addressed to the slave device.

In certain examples, the slave device may initiate a pulse by driving the single-wire serial bus from the first signaling state to the second signaling state. The slave device may present a high impedance to the single-wire serial bus after initiating the pulse. The slave device may synchronize a clock signal generated by the slave device based on transitions in one or more synchronization pulses received from the single-wire serial bus after each SSC received over the single-wire serial bus. The slave device may synchronize phase or frequency of a clock signal generated by the slave device based on transitions in the Manchester encoded command or in a Manchester encoded data payload received from the single-wire serial bus.

In some examples, the slave device may receive a Manchester encoded data payload from the single-wire serial bus when the command comprises a write command. The slave device may be configured to decode the data payload. The slave device may transmit a Manchester encoded data payload over the single-wire serial bus when the command is a read command. The slave device may transmit one or more synchronization pulses over the single-wire serial bus prior to transmitting the Manchester encoded data payload.

Figure 15:
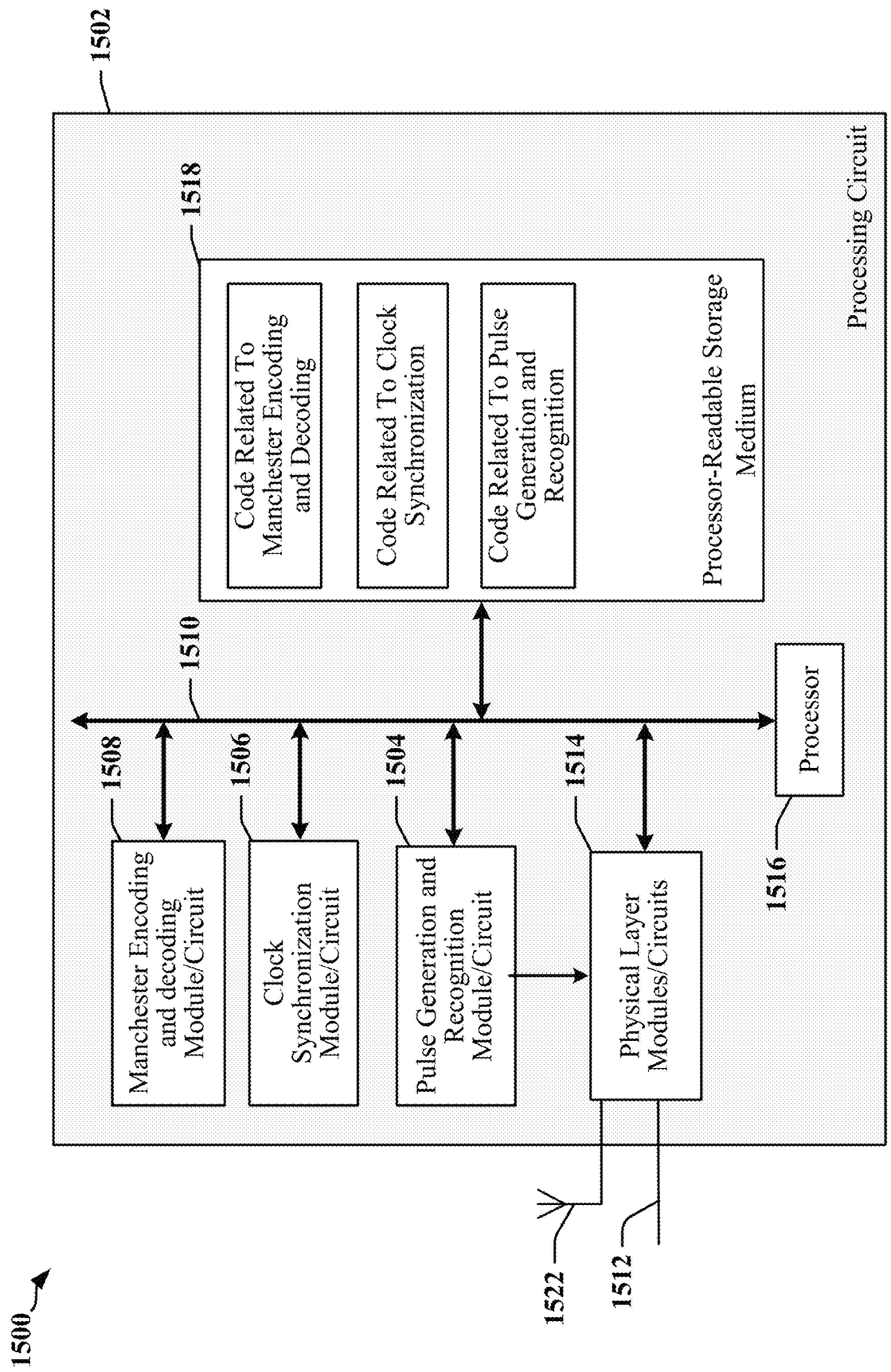
FIG. 15 illustrates an example of a hardware implementation for an apparatus adapted in accordance with certain aspects disclosed herein.

FIG. 15 is a diagram illustrating an example of a hardware implementation for an apparatus 1500 employing a processing circuit 1502. The processing circuit typically has a controller or processor 1516 that may include one or more microprocessors, microcontrollers, digital signal processors, sequencers and/or state machines. The processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including one or more processors and/or hardware modules, represented by the controller or processor 1516, the modules or circuits 1504, 1506 and 1508 and the processor-readable storage medium 1518. One or more physical layer circuits and/or modules 1514 may be provided to support communication over a communication link implemented using a multi-wire bus 1512, through an antenna or antenna array 1522 (to a radio access network for example), and so on. The bus 1510 may also link various other circuits such as timing sources, peripherals, voltage regulators, and power management circuits, which are well known in the art, and therefore, will not be described any further.

The processor 1516 is responsible for general processing, including the execution of software, code and/or instructions stored on the processor-readable storage medium 1518. The processor-readable storage medium 1518 may include a non-transitory storage medium. The software, when executed by the processor 1516, causes the processing circuit 1502 to perform the various functions described herein, and for any particular apparatus. The processor-readable storage medium 1518 may be used for storing data that is manipulated by the processor 1516 when executing software. The processing circuit 1502 further includes at least one of the modules 1504, 1506 and 1508. The modules 1504, 1506 and 1508 may be software modules running in the processor 1516, resident/stored in the processor-readable storage medium 1518, one or more hardware modules coupled to the processor 1516, or some combination thereof. The modules 1504, 1506 and 1508 may include microcontroller instructions, state machine configuration parameters, or some combination thereof.

In one configuration, the apparatus 1500 includes modules and/or circuits 1504 adapted to generate and process different types of SSCs and synchronization pulses, modules and/or circuits 1506 adapted to synchronize an internal clock signal based on synchronization pulses and transitions in Manchester-encoded data or commands, and modules and/or circuits 1508 adapted to encode and decode data and commands using Manchester encoding.

In one example, the apparatus 1500 includes physical layer circuits and/or modules 1514 that implement an interface circuit with at least one line driver adapted or configured to couple the apparatus 1500 to a single-wire serial bus. The apparatus 1500 may have a processor 1516 or protocol controller. The apparatus 1500 may include or be coupled to a keeper circuit through the single-wire serial bus. The keeper circuit may be operable to maintain the single-wire serial bus at a constant signaling state after the line driver in the bus master device and slave devices present a high impedance to the single-wire serial bus.

In a first example, the processor 1516 or protocol controller is configured to determine that a first SSC has been initiated when the single-wire serial bus has transitioned from a first signaling state to a second signaling state. The processor 1516 or protocol controller may be further configured to cause the line driver to drive the single-wire serial bus from the second signaling state to the first signaling state after a first duration, thereby completing the first SSC. The processor 1516 or protocol controller may be further configured to provide an arbitration window that comprises a plurality of timeslots by causing the line driver to present a high impedance to the single-wire serial bus after the first SSC is completed. The processor 1516 or protocol controller may be further configured to cause the line driver to drive the single-wire serial bus to the first signaling state in each timeslot in the plurality of timeslots in which the single-wire serial bus is driven to the second signaling state. The processor 1516 or protocol controller may be further configured to transmit a second SSC after the arbitration window is expired, and transmit a command addressed to at least one slave device after transmitting the second SSC. The command may be encoded using Manchester encoding, In some instances, the processor 1516 or protocol controller may initiate the first SSC. Prior to the first SSC, the single-wire serial bus may be in an idle state.

The processor 1516 or protocol controller may be further configured to provide one or more synchronization pulses on the single-wire serial bus after terminating the first SSC, and to provide one or more additional synchronization pulses on the single-wire serial bus after transmitting the second SSC.

The processor 1516 or protocol controller may be further configured to transmit a Manchester encoded data payload over the single-wire serial bus when the command comprises a write command formatted in accordance with an RFFE protocol. The processor 1516 or protocol controller may be further configured to provide a line turnaround interval by causing the line driver to present a high impedance to the single-wire serial bus after transmitting the command. The processor 1516 or protocol controller may be further configured to synchronize an internal clock signal using one or more synchronization pulses received from the single-wire serial bus after the line turnaround interval. The processor 1516 or protocol controller may be further configured to receive a Manchester encoded data payload from the single-wire serial bus when the command comprises a read command formatted in accordance with an RFFE protocol. The processor 1516 or protocol controller may be further configured to maintain synchronization of phase or frequency of the internal clock signal based on transitions in the Manchester encoded payload.

In a second example, the processor 1516 or protocol controller is configured to determine a duration of a pulse on the single-wire serial bus, and drive the single-wire serial bus from a first signaling state to a second signaling state during a timeslot associated with a slave device in an arbitration window that follows the pulse on the single-wire serial bus when the pulse has a first duration that corresponds to a first type of SSC. The processor 1516 or protocol controller may be further configured to receive a Manchester encoded command from a bus master device over the single-wire serial bus when the pulse has a second duration that corresponds to a second type of SSC. The processor 1516 or protocol controller may be further configured to respond to the command when the command is addressed to the apparatus 1500.

In the second example, the processor 1516 or protocol controller may be further configured to initiate a pulse by driving the single-wire serial bus to the second signaling state from the first signaling state, and to present a high impedance to the single-wire serial bus after initiating the pulse. The processor 1516 or protocol controller may be further configured to synchronize a clock signal generated by the apparatus 1500 based on transitions in one or more synchronization pulses received from the single-wire serial bus after each SSC received over the single-wire serial bus. The processor 1516 or protocol controller may be further configured to receive a Manchester encoded data payload from the single-wire serial bus when the command comprises a write command; and decode the data payload. The processor 1516 or protocol controller may be further configured to transmit a Manchester encoded data payload over the single-wire serial bus when the command comprises a read command. The processor 1516 or protocol controller may be further configured to transmit one or more synchronization pulses over the single-wire serial bus prior to transmitting the Manchester encoded data payload.

Some implementation examples are described in the following numbered clauses:

1. A method of data communication performed at a bus master device, comprising: determining that a first SSC has been initiated when a single-wire serial bus has transitioned from a first signaling state to a second signaling state; causing a line driver to drive the single-wire serial bus from the second signaling state to the first signaling state after a first duration, thereby completing the first SSC; providing an arbitration window that comprises a plurality of timeslots by causing the line driver to present a high impedance to the single-wire serial bus after the first SSC is completed; causing the line driver to drive the single-wire serial bus to the first signaling state in each timeslot in the plurality of timeslots in which the single-wire serial bus is driven to the second signaling state; transmitting a second SSC after the arbitration window is expired; and transmitting a command addressed to at least one slave device after transmitting the second SSC, the command being encoded using Manchester encoding.
2. The method as described in clause 1, wherein the command is formatted in accordance with an RFFE protocol.
3. The method as described in clause 1 or clause 2, further comprising: initiating the first SSC by causing the line driver to drive the single-wire serial bus to the second signaling state to terminate an idle state of the single-wire serial bus.
4. The method as described in any of clauses 1-3, wherein the second SSC has a second duration that is different from the first duration.
5. The method as described in any of clauses 1-4, wherein a keeper circuit coupled to the single-wire serial bus is operable to maintain signaling state of the single-wire serial bus when the single-wire serial bus is undriven.
6. The method as described in any of clauses 1-5, further comprising: providing one or more synchronization pulses on the single-wire serial bus after terminating the first SSC.
7. The method as described in any of clauses 1-6, further comprising: providing one or more synchronization pulses on the single-wire serial bus after transmitting the second SSC.
8. The method as described in any of clauses 1-7, further comprising transmitting a data payload over the single-wire serial bus when the command comprises a write command, the data payload being encoded using Manchester encoding.
9. The method as described in any of clauses 1-8, further comprising receiving a Manchester encoded data payload from the single-wire serial bus when the command comprises a read command.
10. The method as described in clause 9, further comprising: providing a line turnaround interval by causing the line driver to present a high impedance to the single-wire serial bus after transmitting the command; synchronizing an internal clock signal using one or more synchronization pulses received from the single-wire serial bus after the line turnaround interval; and maintaining synchronization of phase or frequency of the internal clock signal based on transitions in the Manchester encoded payload.
11. A data communication apparatus, comprising: a line driver configured to couple the data communication apparatus to a single-wire serial bus; and a protocol controller configured to: determine that a first SSC has been initiated when the single-wire serial bus has transitioned from a first signaling state to a second signaling state; cause the line driver to drive the single-wire serial bus from the second signaling state to the first signaling state after a first duration, thereby completing the first SSC; provide an arbitration window that comprises a plurality of timeslots by causing the line driver to present a high impedance to the single-wire serial bus after the first SSC is completed; cause the line driver to drive the single-wire serial bus to the first signaling state in each timeslot in the plurality of timeslots in which the single-wire serial bus is driven to the second signaling state; transmit a second SSC after the arbitration window is expired; and transmit a command addressed to at least one slave device after transmitting the second SSC, the command being encoded using Manchester encoding.

12. The data communication apparatus as described in clause 11, further comprising: a keeper circuit coupled to the single-wire serial bus and operable to maintain signaling state of the single-wire serial bus when the single-wire serial bus is undriven.

13. The data communication apparatus as described in clause 11 or clause 12, wherein the protocol controller is further configured to: initiate the first SSC by causing the line driver to drive the single-wire serial bus to the second signaling state to terminate an idle state of the single-wire serial bus; provide one or more synchronization pulses on the single-wire serial bus after terminating the first SSC; and provide one or more additional synchronization pulses on the single-wire serial bus after transmitting the second SSC.

14. The data communication apparatus as described in in any of clauses 11-13, wherein the protocol controller is further configured to: transmit a Manchester encoded data payload over the single-wire serial bus when the command comprises a write command formatted in accordance with an RFFE protocol.

15. The data communication apparatus as described in in any of clauses 11-14, wherein the protocol controller is further configured to: provide a line turnaround interval by causing the line driver to present a high impedance to the single-wire serial bus after transmitting the command; synchronize an internal clock signal using one or more synchronization pulses received from the single-wire serial bus after the line turnaround interval; receive a Manchester encoded data payload from the single-wire serial bus when the command comprises a read command formatted in accordance with an RFFE protocol; and maintain synchronization of phase or frequency of the internal clock signal based on transitions in the Manchester encoded payload.

16. A method of data communication performed at a slave device, comprising: determining a duration of a pulse on a single-wire serial bus; driving the single-wire serial bus from a first signaling state to a second signaling state during a timeslot associated with the slave device in an arbitration window that follows the pulse on the single-wire serial bus when the pulse has a first duration that corresponds to a first type of SSC; receiving a Manchester encoded command from a bus master device over the single-wire serial bus when the pulse has a second duration that corresponds to a second type of SSC; and responding to the command when the command is addressed to the slave device.

17. The method as described in clause 16, wherein the command is formatted in accordance with an RFFE protocol.

18. The method as described in clause 16 or clause 17, further comprising: initiating a pulse by driving the single-wire serial bus from the first signaling state to the second signaling state; and presenting a high impedance to the single-wire serial bus after initiating the pulse.

19. The method as described in any of clauses 16-18, further comprising: synchronizing a clock signal generated by the slave device based on transitions in one or more synchronization pulses received from the single-wire serial bus after each SSC received over the single-wire serial bus.

20. The method as described in any of clauses 16-19, further comprising: synchronizing phase or frequency of a clock signal generated by the slave device based on transitions in the Manchester encoded command or in a Manchester encoded data payload received from the single-wire serial bus.

21. The method as described in any of clauses 16-20, further comprising: receiving a Manchester encoded data payload from the single-wire serial bus when the command comprises a write command; and decoding the data payload.

22. The method as described in any of clauses 16-21, further comprising transmitting a Manchester encoded data payload over the single-wire serial bus when the command comprises a read command.

23. The method as described in clause 22, further comprising: transmitting one or more synchronization pulses over the single-wire serial bus prior to transmitting the Manchester encoded data payload.

24. A data communication apparatus, comprising: a line driver configured to couple the data communication apparatus to a single-wire serial bus; and a protocol controller configured to: determine a duration of a pulse on the single-wire serial bus; drive the single-wire serial bus from a first signaling state to a second signaling state during a timeslot associated with the data communication apparatus in an arbitration window that follows the pulse on the single-wire serial bus when the pulse has a first duration that corresponds to a first type of SSC; receive a Manchester encoded command from a bus master device over the single-wire serial bus when the pulse has a second duration that corresponds to a second type of SSC; and respond to the command when the command is addressed to the data communication apparatus.

25. The data communication apparatus as described in clause 24, wherein the protocol controller is further configured to: initiate a pulse by driving the single-wire serial bus to the second signaling state from the first signaling state; and present a high impedance to the single-wire serial bus after initiating the pulse.

26. The data communication apparatus as described in clause 24 or clause 25, wherein the protocol controller is further configured to: synchronize a clock signal generated by the data communication apparatus based on transitions in one or more synchronization pulses received from the single-wire serial bus after each SSC received over the single-wire serial bus.

27. The data communication apparatus as described in any of clauses 24-26, wherein the protocol controller is further configured to: receive a Manchester encoded data payload from the single-wire serial bus when the command comprises a write command; and decode the data payload.

28. The data communication apparatus as described in any of clauses 24-27, wherein the protocol controller is further configured to: transmit a Manchester encoded data payload over the single-wire serial bus when the command comprises a read command.

29. The data communication apparatus as described in clause 28, wherein the protocol controller is further configured to: transmit one or more synchronization pulses over the single-wire serial bus prior to transmitting the Manchester encoded data payload It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communication performed at a bus master device, comprising:
   determining that a first sequence start condition (SSC) has been initiated when a single-wire serial bus has transitioned from a first signaling state to a second signaling state;
   causing a line driver to drive the single-wire serial bus from the second signaling state to the first signaling state after a first duration, thereby completing the first SSC;
   providing an arbitration window that comprises a plurality of timeslots by causing the line driver to present a high impedance to the single-wire serial bus after the first SSC is completed;
   causing the line driver to drive the single-wire serial bus to the first signaling state in each timeslot in the plurality of timeslots in which the single-wire serial bus is driven to the second signaling state;
   transmitting a second SSC after the arbitration window is expired; and
   transmitting a command addressed to at least one slave device after transmitting the second SSC, the command being encoded using Manchester encoding.

2. The method of claim 1, wherein the command is formatted in accordance with a Radio Frequency Front-End (RFFE) protocol.

3. The method of claim 1, further comprising:
   initiating the first SSC by causing the line driver to drive the single-wire serial bus to the second signaling state to terminate an idle state of the single-wire serial bus.

4. The method of claim 1, wherein the second SSC has a second duration that is different from the first duration.

5. The method of claim 1, wherein a keeper circuit coupled to the single-wire serial bus is operable to maintain signaling state of the single-wire serial bus when the single-wire serial bus is undriven.

6. The method of claim 1, further comprising:
   providing one or more synchronization pulses on the single-wire serial bus after terminating the first SSC.

7. The method of claim 1, further comprising:
   providing one or more synchronization pulses on the single-wire serial bus after transmitting the second SSC.

8. The method of claim 1, further comprising transmitting a Manchester encoded data payload over the single-wire serial bus when the command comprises a write command.

9. The method of claim 1, further comprising receiving a Manchester encoded data payload from the single-wire serial bus when the command comprises a read command.

10. The method of claim 9, further comprising:
    providing a line turnaround interval by causing the line driver to present a high impedance to the single-wire serial bus after transmitting the command;
    synchronizing an internal clock signal using one or more synchronization pulses received from the single-wire serial bus after the line turnaround interval; and
    maintaining synchronization of phase or frequency of the internal clock signal based on transitions in the Manchester encoded data payload.

11. A data communication apparatus, comprising:
    a line driver configured to couple the data communication apparatus to a single-wire serial bus; and
    a protocol controller configured to:
    determine that a first sequence start condition (SSC) has been initiated when the single-wire serial bus has transitioned from a first signaling state to a second signaling state;
    cause the line driver to drive the single-wire serial bus from the second signaling state to the first signaling state after a first duration, thereby completing the first SSC;
    provide an arbitration window that comprises a plurality of timeslots by causing the line driver to present a high impedance to the single-wire serial bus after the first SSC is completed;
    cause the line driver to drive the single-wire serial bus to the first signaling state in each timeslot in the plurality of timeslots in which the single-wire serial bus is driven to the second signaling state;
    transmit a second SSC after the arbitration window is expired; and
    transmit a command addressed to at least one slave device after transmitting the second SSC, the command being encoded using Manchester encoding.

12. The data communication apparatus of claim 11, further comprising:
    a keeper circuit coupled to the single-wire serial bus and operable to maintain signaling state of the single-wire serial bus when the single-wire serial bus is undriven.

13. The data communication apparatus of claim 11, wherein the protocol controller is further configured to:
    initiate the first SSC by causing the line driver to drive the single-wire serial bus to the second signaling state to terminate an idle state of the single-wire serial bus;

provide one or more synchronization pulses on the single-wire serial bus after terminating the first SSC; and
provide one or more additional synchronization pulses on the single-wire serial bus after transmitting the second SSC.

14. The data communication apparatus of claim 11, wherein the protocol controller is further configured to:
transmit a Manchester encoded data payload over the single-wire serial bus when the command comprises a write command formatted in accordance with a Radio Frequency Front-End (RFFE) protocol.

15. The data communication apparatus of claim 11, wherein the protocol controller is further configured to:
provide a line turnaround interval by causing the line driver to present a high impedance to the single-wire serial bus after transmitting the command;
synchronize an internal clock signal using one or more synchronization pulses received from the single-wire serial bus after the line turnaround interval;
receive a Manchester encoded data payload from the single-wire serial bus when the command comprises a read command formatted in accordance with an RFFE protocol; and
maintain synchronization of phase or frequency of the internal clock signal based on transitions in the Manchester encoded data payload.

16. A method of data communication performed at a slave device, comprising:
determining a duration of a first pulse on a single-wire serial bus;
driving the single-wire serial bus from a first signaling state to a second signaling state through initiating a second pulse during a timeslot associated with the slave device in an arbitration window that follows the first pulse on the single-wire serial bus when the first pulse has a first duration that corresponds to a first type of sequence start condition (SSC);
presenting a high impedance to the single-wire serial bus after initiating the second pulse;
receiving a Manchester encoded command from a bus master device over the single-wire serial bus when the first pulse has a second duration that corresponds to a second type of SSC; and
responding to the command when the command is addressed to the slave device.

17. The method of claim 16, wherein the command is formatted in accordance with a Radio Frequency Front-End (RFFE) protocol.

18. The method of claim 16, further comprising:
synchronizing a clock signal generated by the slave device based on transitions in one or more synchronization pulses received from the single-wire serial bus after each SSC received over the single-wire serial bus.

19. The method of claim 16, further comprising:
synchronizing phase or frequency of a clock signal generated by the slave device based on transitions in the Manchester encoded command or in a Manchester encoded data payload received from the single-wire serial bus.

20. The method of claim 16, further comprising:
receiving a Manchester encoded data payload from the single-wire serial bus when the command comprises a write command; and
decoding the Manchester encoded data payload.

21. The method of claim 16, further comprising transmitting a Manchester encoded data payload over the single-wire serial bus when the command comprises a read command.

22. The method of claim 21, further comprising:
transmitting one or more synchronization pulses over the single-wire serial bus prior to transmitting the Manchester encoded data payload.

23. A data communication apparatus, comprising:
a line driver configured to couple the data communication apparatus to a single-wire serial bus; and
a protocol controller configured to:
determine a duration of a first pulse on the single-wire serial bus;
drive the single-wire serial bus from a first signaling state to a second signaling state through initiating a second pulse during a timeslot associated with the data communication apparatus in an arbitration window that follows the first pulse on the single-wire serial bus when the first pulse has a first duration that corresponds to a first type of sequence start condition (SSC);
present a high impedance to the single-wire serial bus after initiating the second pulse;
receive a Manchester encoded command from a bus master device over the single-wire serial bus when the first pulse has a second duration that corresponds to a second type of SSC; and
respond to the command when the command is addressed to the data communication apparatus.

24. The data communication apparatus of claim 23, wherein the protocol controller is further configured to:
synchronize a clock signal generated by the data communication apparatus based on transitions in one or more synchronization pulses received from the single-wire serial bus after each SSC received over the single-wire serial bus.

25. The data communication apparatus of claim 23, wherein the protocol controller is further configured to:
receive a Manchester encoded data payload from the single-wire serial bus when the command comprises a write command; and
decode the Manchester encoded data payload.

26. The data communication apparatus of claim 23, wherein the protocol controller is further configured to:
transmit a Manchester encoded data payload over the single-wire serial bus when the command comprises a read command.

27. The data communication apparatus of claim 26, wherein the protocol controller is further configured to:
transmit one or more synchronization pulses over the single-wire serial bus prior to transmitting the Manchester encoded data payload.

* * * * *